United States Patent
Hosie et al.

(10) Patent No.: US 10,808,483 B2
(45) Date of Patent: Oct. 20, 2020

(54) SYSTEM FOR HYDROCARBON RECOVERY

(71) Applicant: GE Oil & Gas UK Limited, Aberdeen, Scotland (GB)

(72) Inventors: Stanley Hosie, Katy, TX (US); Paul White, Aberdeen (GB); Simon Corrigan, Aberdeen (GB); Brian Craig, Aberdeen (GB); Bobby Voss, Houston, TX (US); Michael Ross, Aberdeen (GB)

(73) Assignee: GE Oil & Gas UK Limited, Aberdeen, Scotland (GB)

( * ) Notice: Subject to any disclaimer, the term of this patent is extended or adjusted under 35 U.S.C. 154(b) by 267 days.

(21) Appl. No.: 15/938,457

(22) Filed: Mar. 28, 2018

(65) Prior Publication Data

US 2018/0283124 A1    Oct. 4, 2018

Related U.S. Application Data

(60) Provisional application No. 62/477,801, filed on Mar. 28, 2017.

(51) Int. Cl.
| | | |
|---|---|---|
| *E21B 33/03* | (2006.01) | |
| *E21B 47/07* | (2012.01) | |
| *E21B 34/04* | (2006.01) | |
| *E21B 34/02* | (2006.01) | |

(Continued)

(52) U.S. Cl.
CPC .............. *E21B 33/03* (2013.01); *E21B 34/02* (2013.01); *E21B 34/04* (2013.01); *E21B 47/06* (2013.01); *E21B 47/07* (2020.05); *E21B 33/035* (2013.01)

(58) Field of Classification Search
CPC .......... E21B 33/03; E21B 34/04; E21B 34/02; E21B 47/06; E21B 47/065; E21B 43/12; E21B 43/14
See application file for complete search history.

(56) References Cited

U.S. PATENT DOCUMENTS

| | | |
|---|---|---|
| 4,848,473 A | 7/1989 | Lochte |
| 5,010,956 A | 4/1991 | Bednar |
| 5,143,158 A | 9/1992 | Watkins et al. |

(Continued)

FOREIGN PATENT DOCUMENTS

| | | |
|---|---|---|
| WO | 2015/142183 A1 | 9/2015 |
| WO | 2018/022770 | 2/2018 |

OTHER PUBLICATIONS

"Nonretrievable Choke Valves," https://cameron.slb.com/products-and-services/subsea/valves-and-valve-automation/choke-valves/non-retrievable-chokes, 2018, Schlumberger Limited.

(Continued)

*Primary Examiner* — Wei Wang
(74) *Attorney, Agent, or Firm* — Hogan Lovells US LLP

(57) ABSTRACT

Embodiments of the present disclosure include a system for directing the flow of fluids via a production tree. The production tree extends upwardly from a lower surface to an upper surface and at least partially enclosing an upper section of a production bore and an upper section of an annulus bore, wherein one of a lower section and the upper section of the production bore includes a first production valve, the upper section of the production bore includes a second production valve, and the upper section of the annulus bore includes a second annulus valve.

20 Claims, 15 Drawing Sheets

(51) Int. Cl.
E21B 47/06 (2012.01)
E21B 33/035 (2006.01)

(56) References Cited

U.S. PATENT DOCUMENTS

| | | | |
|---|---|---|---|
| 5,941,305 A * | 8/1999 | Thrasher | E21B 43/121 166/53 |
| 5,971,077 A | 10/1999 | Lilley | |
| 6,176,466 B1 | 1/2001 | Lam et al. | |
| 6,357,529 B1 | 3/2002 | Kent et al. | |
| 6,460,621 B2 | 10/2002 | Fenton et al. | |
| 6,637,514 B1 | 10/2003 | Donald et al. | |
| 6,698,520 B2 | 3/2004 | Fenton et al. | |
| 7,025,132 B2 | 4/2006 | Kent et al. | |
| 7,111,687 B2 | 9/2006 | Donald et al. | |
| 7,201,229 B2 | 4/2007 | White et al. | |
| 7,490,673 B2 | 2/2009 | Bartlett | |
| 7,740,074 B2 | 6/2010 | White et al. | |
| 7,909,103 B2 | 3/2011 | Fenton | |
| 7,992,633 B2 | 8/2011 | Donald et al. | |
| 7,992,643 B2 | 8/2011 | Donald et al. | |
| 8,066,067 B2 | 11/2011 | Donald et al. | |
| 8,066,075 B2 | 11/2011 | Cowie et al. | |
| 8,091,630 B2 | 1/2012 | Donald et al. | |
| 8,104,541 B2 | 1/2012 | Donald et al. | |
| 8,122,948 B2 | 2/2012 | Donald et al. | |
| 8,297,360 B2 | 10/2012 | Donald et al. | |
| 8,469,086 B2 | 6/2013 | Donald et al. | |
| 8,540,018 B2 | 9/2013 | Donald et al. | |
| 8,573,306 B2 | 11/2013 | Donald et al. | |
| 8,613,323 B2 | 12/2013 | Garbett et al. | |
| 8,622,138 B2 | 1/2014 | Donald et al. | |
| 8,672,038 B2 | 3/2014 | Tan et al. | |
| 8,733,436 B2 | 5/2014 | Donald et al. | |
| 8,746,332 B2 | 6/2014 | Donald et al. | |
| 8,776,893 B2 | 7/2014 | Donald et al. | |
| 9,556,710 B2 | 1/2017 | Donald et al. | |
| 2014/0238687 A1 | 8/2014 | Donald et al. | |
| 2015/0337632 A1 | 11/2015 | Dahlem et al. | |
| 2017/0183935 A1 | 6/2017 | Brown et al. | |

OTHER PUBLICATIONS

"MARS Multiple application reinjection system" OneSubsea A Schlumberger Company, Brochure, 2016, http://www.onesubsea.slb.com/Mars, 8 pages.
"MARS Multiple application reinjection system" OneSubsea A Schlumberger Company, Data Sheet, 2016, http://www.onesubsea.slb.com/MARS, 4 pages.
American Petroleum Institute, API SPEC 17D, 2nd Edition, Sep. 2011, Design and Operation of Subsea Production Systems, Part 4: Subsea Wellhead and Tree Equipment, p. 40.
American Petroleum Institute, API SPEC 17D, 2nd Edition, Sep. 2011, 6.2.8 Production (injection) and annulus flow paths.
T. L. McInturff et al., "An Overview of the Zinc Subsea Tree and Wellhead System," 25th Annual Offshore Technology Conference in Houston, Texas, May 3-6, 1993, pp. 227-234.
International Search Report and Written Opinion issued in connection with corresponding PCT Application No. PCT/IB2018/000400 dated Sep. 17, 2018.

* cited by examiner

SYSTEM FOR HYDROCARBON RECOVERY

CROSS-REFERENCE TO RELATED APPLICATIONS

This application claims priority to and the benefit of U.S. Provisional Application Ser. No. 62/477,801, filed Mar. 28, 2017, the full disclosure of which is hereby incorporated herein by reference in its entirety for all purposes.

BACKGROUND

1. Field of the Invention

The present disclosure relates to hydrocarbon recovery systems. More particularly, the present disclosure relates to production systems, such as subsea production systems, for hydrocarbon recovery.

2. Description of Related Art

In oil and gas exploration, sets of valves, spools, and fittings are connected to a well and referred to as a Christmas tree. The components of the Christmas tree direct and control the flow of fluids into and out of underground formations containing hydrocarbons. A variety of government regulations stipulate the number of barriers arranged between the well and atmosphere, thereby generating complicated and often expensive arrangements on wells. It is now recognized that simplified production systems are desired.

SUMMARY

Applicants recognized the problems noted above herein and conceived and developed embodiments of systems and methods, according to the present disclosure, for hydrocarbon recovery systems.

In an embodiment a system for recovering hydrocarbons from a wellbore includes a tubing head spool positioned in the wellbore, the tubing head spool receiving production tubing for transporting downhole fluids to a surface location. The system also includes a first annulus valve, which may be controlled by a controller, formed in the tubing head spool, the first annulus valve being fluidly coupled to an annulus of the wellbore. The system further includes a production tree coupled to the tubing head spool. The production tree includes a production bore fluidly coupled to the production tubing via the tubing head spool (e.g., the tubing hanger in the tubing head spool), the production bore extending through a body of the production tree toward a tree cap and directing the downhole fluids out of the production tree. The production tree also includes a first production valve arranged in the production bore, the first production valve being moveable between an open position and a closed position to regulate the flow of the downhole fluids through the production bore and positioned in a downstream direction from the production tubing. The production tree also includes a second production valve arranged in the production bore, the second production valve being movable between an open position and a closed position to regulate the flow of the downhole fluids through the production bore, the second production valve positioned downstream of the first production valve and in series with the first production valve such that downhole fluids that flow through the first production valve are directed toward the second production valve, the second production valve being upstream relative to the tree cap. Additionally, the production tree includes an annulus bore fluidly coupled to the annulus of the wellbore, the annulus bore being coupled to the production bore downstream of the tree cap at a coupling. The production tree also includes a second annulus valve arranged in the annulus bore, the second annulus valve being positioned downstream of the first annulus valve and upstream of the coupling to the production bore. The first production valve and the second production valve provide two barriers of protection between the wellbore and a tree outlet and the first annulus valve and the second annulus valve provide two barriers of protection between the wellbore annulus and the tree outlet, the two barriers formed by the first annulus valve and the second annulus valve being upstream of the coupling to the production bore.

In a further embodiment a system for directing the flow of fluids into and out of underground formations containing hydrocarbons includes a wellhead apparatus supporting a tubing hanger, the wellhead apparatus at least partially enclosing a lower section of a production bore and a lower section of an annulus bore, wherein the lower section of the annulus bore includes a first annulus valve. The system also includes a production tree positioned downstream of and coupled to the wellhead apparatus, the production tree extending upwardly from a lower surface to an upper surface and at least partially enclosing an upper section of the production bore and an upper section of the annulus bore, wherein one of the lower section and the upper section of the production bore includes a first production valve, the upper section of the production bore includes a second production valve, and the upper section of the annulus bore includes a second annulus valve. The system also includes a manifold positioned downstream and coupled to the production tree, wherein the manifold includes at least one manifold valve and controls a flow of fluid from the production tree.

In an embodiment a system for recovering hydrocarbons from a wellbore includes a production tree coupled to the wellbore, the production tree includes a production bore and an annulus bore, both extending from a base of the production tree to a top of the production tree. The system also includes a first production valve arranged in the production bore, the first production valve being movable between an open position and a closed position to regulate flow of a fluid through the production bore. Additionally, the system includes a second production valve arranged in the production bore downstream of the first production valve, the second production valve being moveable between an open position and a closed position to regulate flow of fluid through the production bore. The system also includes a first annulus valve arranged in the annulus bore, the first annulus valve being movable between an open position and a closed position to regulate flow of fluid through the annulus bore. The system includes a first production valve actuator coupled to the first production valve, the first production valve actuator extending radially outward from the production tree at a first circumferential location. The system also includes a second production valve actuator coupled to the second production valve, the second production valve actuator extending radially outward from the production tree at a second circumferential location, the second circumferential location being offset from the first circumferential location such that the first and second production valve actuators extend radially outward in different radial directions.

BRIEF DESCRIPTION OF DRAWINGS

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

DETAILED DESCRIPTION

Figure 1:
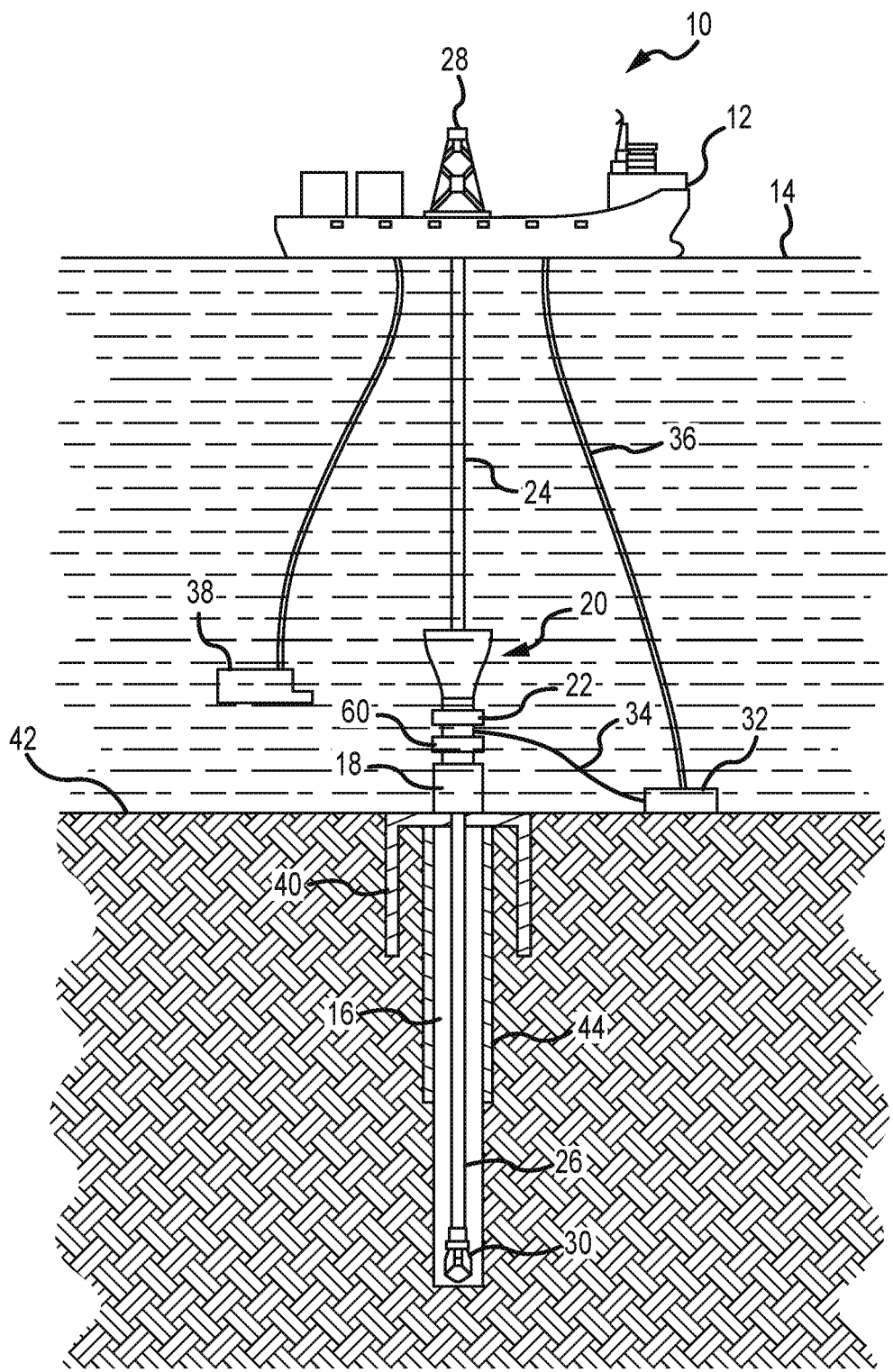
FIG. 1 is a schematic side view of an embodiment of a subsea drilling operation, in accordance with embodiments of the present disclosure.

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions. Furthermore, as used herein, "downstream" or "upstream" is described with reference to flow out of a wellbore, unless otherwise specified, for clarity and embodiments of the present disclosure should not be limited as such.

Embodiments of the present disclosure include a simplified Christmas tree (XT) (e.g., production tree) arrangement for use in oil and gas recovery. The simplified XT eliminates several fittings and valves which may traditionally be found on the XT, thereby reducing costs and complexity at the well site. Moreover, the reduced number of fittings and valves also reduces the number of potential leak points on the XT and enables associated control modules to control valves and equipment associated with auxiliary components, further simplifying well site operations by reducing the total number of controllers used for recovery operations. Furthermore, in certain embodiments, the simplified XT is shorter, thinner, and lighter than a traditional XT. As a result, the XT may be easier to haul to the well site, easier to install at the well site without specialized equipment, and also more compact to enable associated components to be installed proximate the XT. The simplified XT maintains at least two barriers between the wellbore and the environment, thereby satisfying government regulations and industry standards for oil and gas recovery operations. Accordingly, the embodiments disclosed herein enable fabrication of XTs with reduced costs, greater simplicity, and use in a greater number of well site operations.

FIG. 1 is a schematic side view of an embodiment of a subsea drilling operation 10. The drilling operation includes a vessel 12 floating on the sea surface 14 (e.g., a surface location) substantially above a wellbore 16. A wellhead housing 18 sits at the top of the wellbore 16 and is connected to a blowout preventer (BOP) assembly 20. In the illustrated embodiment, the BOP assembly 20 is arranged above a Christmas tree (XT) 22 (e.g., production tree). As will be described below, the XT 22 may include valves, spools, fittings, instrumentation, and the like. The BOP assembly 20 is connected to the vessel 12 by a drilling riser 24. During drilling operations, a drill string 26 passes from a rig 28 on the vessel 12, through the riser 24, through the BOP assembly 20, through the wellhead housing 18, and into the wellbore 16. At the lower end of the drill string 26 is attached a drill bit 30 that extends the wellbore 16 as the drill string 26 turns. Additional features shown in FIG. 1 include a mud pump 32 with mud lines 34 connecting the mud pump 32 to the BOP assembly 20, and a mud return line 36 connecting the mud pump 32 to the vessel 12. A remotely operated vehicle (ROV) 38 can be used to make adjustments to, repair, or replace equipment as necessary. Although a BOP assembly 20 is shown in the figures, the XT 22 could be attached to other well equipment as well, including, for example, a spool, a manifold, or another valve or completion assembly.

One efficient way to start drilling the wellbore 16 is through use of a suction pile 40. Such a procedure is accomplished by attaching the wellhead housing 18 to the top of the suction pile 40 and lowering the suction pile 40 to a sea floor 42. As interior chambers in the suction pile 40 are evacuated, the suction pile 40 is driven into the sea floor 42, as shown in FIG. 1, until the suction pile 40 is substantially submerged in the sea floor 42 and the wellhead housing 18 is positioned at the sea floor 42 so that further drilling can commence. As the wellbore 16 is drilled, the walls of the wellbore are reinforced with casings and concrete 44 to provide stability to the wellbore 16 and help to control pressure from the formation. It should be appreciated that while embodiments of the present disclosure are described with reference to subsea operations, embodiments of the present disclosure may be utilized with surface drilling operations.

Figure 2:
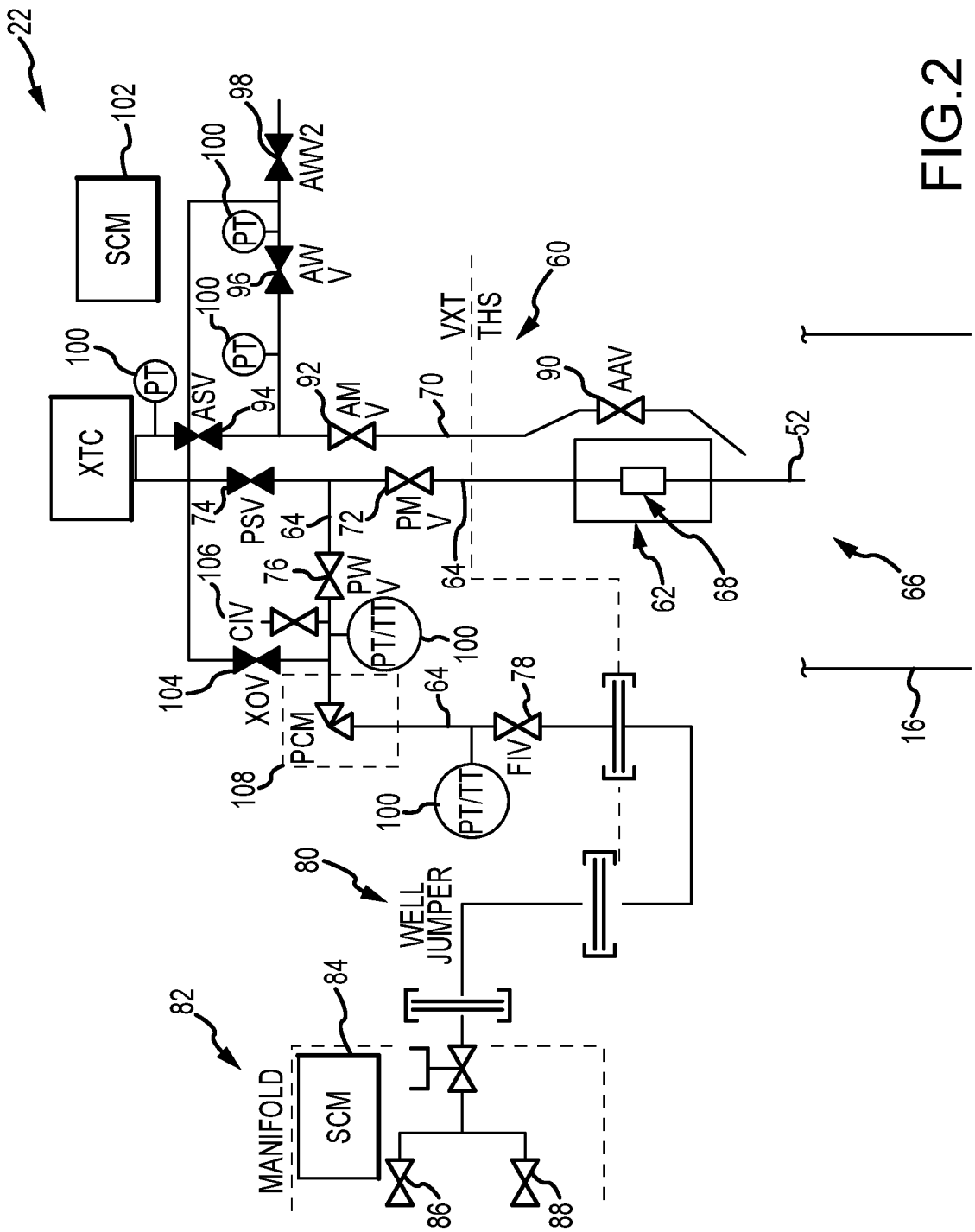
FIG. 2 is a schematic diagram of an embodiment of a Christmas tree (XT) coupled to a tubing head spool, in accordance with embodiments of the present disclosure.

FIG. 2 is a schematic diagram of an embodiment of the XT 22 positioned on a tubing head spool 60. In certain embodiments, components that are positioned at or near the wellbore 16 may be referred to as a wellhead assembly. The tubing head spool 60 is over the wellbore 16 and is coupled to the wellhead housing 18. A tubing hanger 62 lands and locks into the tubing head spool 60 and production tubing 52 extends from the tubing hanger 62 and into the wellbore 16 for recovery of hydrocarbons. In certain embodiments, hydrocarbons may refer to downhole fluids, which may include a liquid, a gas, a solid, or a combination thereof. In the illustrated embodiment, the production tubing 52 is surrounded by an annulus 66, which is arranged between walls of the wellbore 16 and the production tubing 52. An isolation plug 68 is arranged within the tubing hanger 62. During installation or replacement of the XT, the isolation plug 68 blocks pressure from the production tubing 52 from exerting a force on the XT 22. Additionally, arranged proximate a production bore 64 is an annulus bore 70. In the embodiment illustrated in FIG. 2 and further embodiments herein the production bore 64 may appear as a darker and/or thicker line than the annulus bore 70 for clarity. It should be understood that tubing may refer to tubular piping arrangements, often constructed from metal, that have pressure and temperature ratings sufficient for wellbore operations. Furthermore, as used herein, bore refers to a flow path or conduit to transport fluids (e.g., gas, liquid, solid, or a combination thereof). In certain embodiments, the respective bores 64, 70 may be formed by tubing. Moreover, in certain embodiments, the respective bores 64, 70 may be formed within a body or a housing that forms the XT 22. Additionally, in certain embodiments, the respective bores 64, 70 may be formed by a combination of a body, tubing, and any other reasonable component that may be utilized to transport a fluid. Furthermore, it should be understood that while embodiments described herein may include the respective bores 64, 70 arranged side-by-side or substantially parallel, in other embodiments the bores 64, 70 may be concentric such that the bores 64, 70 are axially aligned. In other words, an axis of the production bore 64 may be substantially aligned with an axis of the annulus bore 70. In certain embodiments, the production bore 64 may be larger than the annulus bore 70 and receive the annulus bore 70 within the production bore 64. However, in certain embodiments, the annulus bore 70 may be larger. In certain embodiments, the production bore 64 (at least the portion located within the XT 22) may be approximately 12.7 centimeters (approximately 5 inches), approximately 17.78 centimeters (approximately 7 inches), or any other reasonable size. Moreover, in embodiments, the annulus bore 70 (or at least a portion of it) may be approximately 5.09 centimeters (approximately 2 inches). It should be appreciated that other diameters for the respective bores are within the scope of the present disclosure.

In the embodiment illustrated in FIG. 2, the production bore 64 transfers recovered hydrocarbon, under pressure, from the production tubing 52 to the XT 22 and the annulus bore 70 transfers pressure and fluids, for example, expansion fluids, from the annulus 66 to the XT 22. As illustrated, at least a portion of the production bore 64 is positioned within the tubing head spool 60, which may be referred to as a lower section. Moreover, at least a portion of the production bore 64 is included within the XT 22, which may be referred to as an upper section. The XT 22 of FIG. 2 may be referred to as a vertical XT because of its substantially vertical arrangement. Referring to the production bore 64, moving downstream from the wellbore 16 in a direction relative to the direction of fluid flow out of the wellbore 16, the production bore 64 includes a pair of valves 72, 74. The valves transition between an open and closed position (and intermediate positions in certain embodiments) to regulate flow through the bores. Moreover, for clarity, the valves discussed with reference to the XT 22 may be referred to as first or second valves. The valve 72 may be referred to as a production master valve (PMV) while the valve 74 may be referred to as a production swab valve (PSV). These two valves 72, 74 provide at least two barriers between the reservoir and the environment, per governmental regulations. As used herein, the barrier refers to a valve or other device capable of blocking flow along a flow line. For example, a valve would be a barrier because it may transition to a closed position to block flow. However, an orifice plate would not be a barrier because it would not block flow. Additionally, the production bore 64 includes a valve 76, which may be referred to as a production wing valve (PWV). The PWV 76 is fluidly coupled to a valve 78 that may be referred to as a flowline isolation valve (FIV) via the production bore 64. Accordingly, the production flow path from the wellbore 16 includes the PMV 72, PWV 76, and FIV 78, thereby providing at least two barriers. In operation, the PSV 74 will remain in a closed position with flow being controlled by the PMV 72 and the PWV 76. In the illustrated embodiment, the production bore 64 further includes a well jumper 80, which may be in the form of a tubular in the manner described above, which couples the production bore 64 to a manifold 82. The manifold 82 may include a control module 84, for example, a subsea control module that regulates the operation of one or more valves associated with the manifold 82. In the illustrated embodiment, the manifold 82 includes a pair of production valves 86, 88, which may be controlled by the control module 84. As such, recovered hydrocarbons may be directed out of the wellbore 16 and to the manifold 82, for further processing, storage, or the like. It should be appreciated that while the illustrated embodiment includes the manifold 82, in various embodiments a flow tee or the like, which may include valves, may be utilized to direct the recovered hydrocarbons for further processing, storage, or the like.

Turning to the annulus bore 70, the illustrated embodiment includes a valve 90 which may be referred to as an annulus access valve (AAV) arranged within the tubing head spool 60. It should be appreciated that while the illustrated embodiment includes a single AAV 90 that in other embodiments there may be multiple AAVs 90. The annulus bore 70 further includes a valve 92 which may be referred to as an annulus master valve (AMV). As such, the annulus bore 70 includes at least two barriers between the annulus 66 and the environment. Yet, the annulus bore 70 in the illustrated embodiment also includes a valve 94 which may be referred to as an annulus swab valve (ASV). Additionally, the illustrated XT 22 includes a pair of valves 96, 98 which may be referred to as annulus wing valves (AWV). As such, in each direction of flow along the annulus bore 70 of the XT 22, there are at least two barriers between the formation and the environment.

The illustrated XT 22 also includes a variety of pressure and/or temperature transducers 100. This instrumentation may be arranged between valves, such as the transducer 100 positioned between the AMV 92 and the AWV 96. As such, pressure in the line when the valves are closed may be monitored to check for leaks. For example, by closing the PWV 76, leaks in the bore to the manifold 82 may be evaluated via the one or more transducers 100 arranged on the line. Additionally, the XT 22 includes a control module 102, which may be a subsea control module. The control module 102 may be utilized to control operation of one or more valves on the XT 22. In certain embodiments, the control module 102 receives inputs from one or more of the transducers 100. For example, if one or more of the transducers 100 transmits a signal to the control module 102 indicative of a leak, the control module 102 may react by transmitting a signal to one or more valves to close to block in production of the wellbore 16.

Returning to the production bore 64, a valve 104 which may be referred to as a cross over valve (XOV) is arranged between the PWV 76 and the FIV 78. The XOV 104 provides a connection between the annulus bore 70 and the production bore 64. This connection may be utilized to allow communication between the production and annulus bores 64, 70. Additionally, the production bore 64 includes a chemical injection valve 106 arranged between the PWV 76 and the FIV 78. However, it should be appreciated that the chemical injection valve 106 may be arranged at a different location on the production bore 64. The illustrated embodiment also includes a flow control module 108 (FCM) arranged between the PWV 76 and the FIV 78. The FCM 108 may include a valve or orifice plate to regulate flow to the FIV 78. Moreover, it should be understood that any of the valves described herein could be manual valves or actuated valves (e.g., hydraulic, electric, pneumatic, and the like). That is, the valves may be coupled to controllers and/or actuators to drive movement between an open, a closed position, or some position between. Furthermore, in subsea environments, manual valves may be operated by the ROV 38. Moreover, the valves described herein may be gate valves, globe valves, ball vales, butterfly valves, diaphragm valves, clapper valves, knife valves, needle valves, plug valves, or any other type of valve that may reasonable be utilized for fluid service. Additionally, it should be understood that components of the valves, such as the trim, packing, and the like may be particularly selected for the application in which the valve is used. For example, valves in sour (e.g., hydrogen sulfide) service may include components specified by the NACE International. Additionally, components may be selected for specific temperature of pressure service.

The general size of the production bore 64 and/or the annulus bore 70 may vary along their respective lengths. For example, portions of the production bore 64 may be formed of piping having a larger bore than other portions of the production bore 64. In certain embodiments, the production bore 64 may have a bore of approximately three inches, approximately four inches, approximately five inches, approximately six inches, or any other reasonable size. Moreover, the annulus bore 70 may have a greater or smaller bore than the production bore 64. Additionally, certain portions of the annulus bore 70 may have a different bore size than other portions of the annulus bore 70. In certain embodiments, the annulus bore 70 may have a bore of approximately one inch, approximately two inches, approximately three inches, approximately four inches, or any other reasonable size.

Figure 3A:
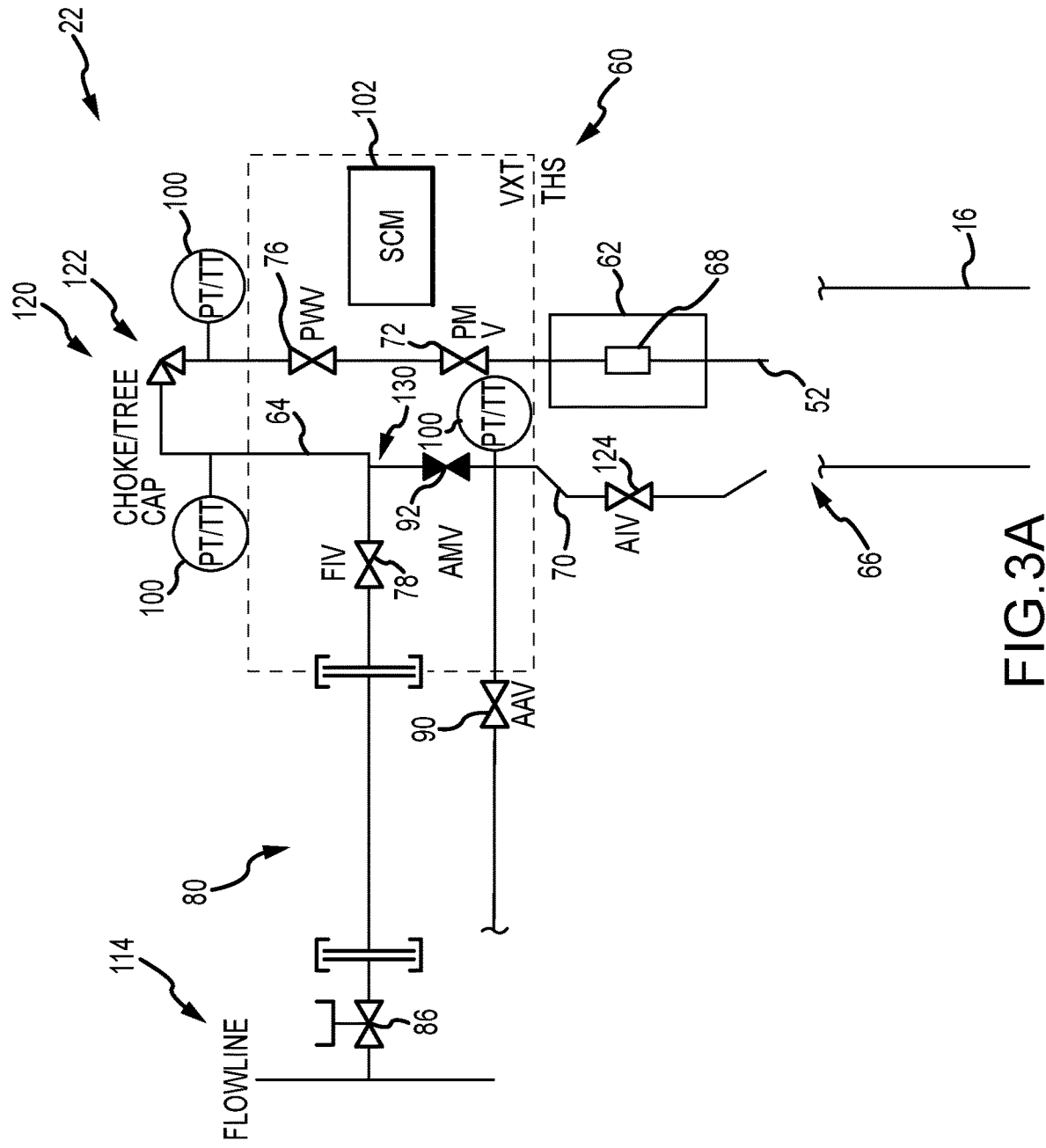
FIG. 3A is a schematic diagram of an embodiment of a simplified XT coupled to a tubing head spool, in accordance with embodiments of the present disclosure.

FIG. 3A is a schematic diagram of the simplified XT 22 arranged on the tubing head spool 60. Advantageously, the simplified XT 22 illustrated in FIG. 3A eliminates multiple valves present in the XT 22 of FIG. 2, while still maintaining the at least two barriers between the pressurized formation and the environment. As such, the XT 22 of FIG. 3A is easier to construct, costs less, and has fewer potential leak points. Moreover, in embodiments, the various valves in the XT 22 illustrated in FIG. 3A may be arranged to reduce the width or diameter of the XT 22, thereby facilitating transportation along roads and reducing the footprint at the well site. For example, compact actuators may be utilized and the valves may be arranged circumferentially about an outer circumference of the XT 22 such that the valves are not stacked at the same position, which also reduces the height of the XT 22. In other words, the actuators, and associated valves, may be at different circumferential or perimeter locations of the XT 22. The embodiment in FIG. 3A includes the wellbore 16 having the production tubing 52. Additionally, the annulus bore 70 is in fluid communication with the annulus 66. The illustrated tubing hanger 62 includes the isolation plug 68 to effectively isolate pressure and fluid from the reservoir and the production bore 64.

Turning to the illustrated production bore 64, the PMV 72 is arranged in series with the PWV 76. In the illustrated embodiment, there are no intervening valves between the PMV 72 and the PWV 76. However, it should be appreciated that in certain embodiments intervening components, such as valves, jumpers, sample lines, instrumentation, and the like may be arranged between the PMV 72 and the PWV 76. The production bore 64 is further coupled to a tree cap 120. In the illustrated embodiment, the tree cap 120 includes a choke 122. The choke 122 includes an orifice to control fluid flow rate and/or downstream system pressure. In certain embodiments, the choke 122 is adjustable to enable parameters of the system to change in accordance with operating conditions. The tree cap 120 is further coupled to the FIV 78 via the production bore 64. Thereafter, the well jumper 80 couples the production bore 64 to a flowline tee 114. In the illustrated embodiment, the flowline tee 114 includes the production valve 86 for directing hydrocarbons from the wellbore 16 to a desired location.

In comparing FIGS. 2 and 3A, several features have been omitted from the production bore 64 illustrated in FIG. 3A to simplify the configuration of the XT 22, while still maintaining at least two barriers between the formation and the environment. For example, the PWV 76 function is combined with PSV 74. Additionally, as will be described below, the XOV 104 may be removed from the system. This reduction in fittings and tubular length will reduce costs of the XT 22, while also adhering to governmental regulations. Furthermore, reducing the number of fittings may reduce the weight of the XT 22, thereby making shipping and/or installation easier because it may be utilized with standard equipment (e.g., flatbed trucks, rig cranes, etc.) without the need for additional specialty equipment (e.g., road escorts, high-weight cranes, etc.). In embodiments where the XT 22 is utilized in subsea services, reducing the overall footprint of the XT 22 may be advantageous because space on an offshore platform, for example, is limited. Additionally, utilizing standardized equipment saves money because the platforms may not be modified to accommodate different cranes and specialty vendors for transporting the goods may not be used.

The simplified XT 22 of FIG. 3A also has simplified annulus bore 70. In the illustrated embodiment, the annulus bore 70 includes a valve 124 which may be referred to as an annulus isolation valve (AIV). The AIV 124 is arranged in series with the AMV 92, which ties directly into the production bore 64 upstream of the FIV 78 at a coupling 130. Upstream is described with reference to the flow of produced hydrocarbons in the production bore 64 flowing out of the wellbore 16 and toward the flowline 114. As such, the AIV 124 is arranged upstream of the AMV 92. Furthermore, the AAV 90 is arranged downstream of the AIV 124. In certain embodiments, the AAV 90 is coupled to a production umbilical. Therefore, when comparing FIGS. 2 and 3A with respect to the annulus bore 70, several valves have been eliminated while maintaining at least two barriers between the annulus 66 and the environment. For example, the AWVs 96, 98 are no longer arranged along the annulus bore 70. Moreover, the ASV 94 has been eliminated from the annulus bore 70. Accordingly, the cost of constructing the XT 22 will be reduced due to the decreased number of valves. Moreover, as described in detail above, the width, weight, height, and other physical features of the XT 22 may be reduced, thereby facilitating simplified transit and installation of the XT 22.

In the illustrated embodiment, the XT 22 includes the control module 102. In embodiments where the manifold 82 replaces the illustrated flowline 114, the manifold 82 may not have the control module 84. Due to the decreased number of valves in the system, the control module 102 may be capable of controlling each valve in the system, further simplifying the configuration of the system and removing the cost of supplying an additional controller.

Figure 3B:
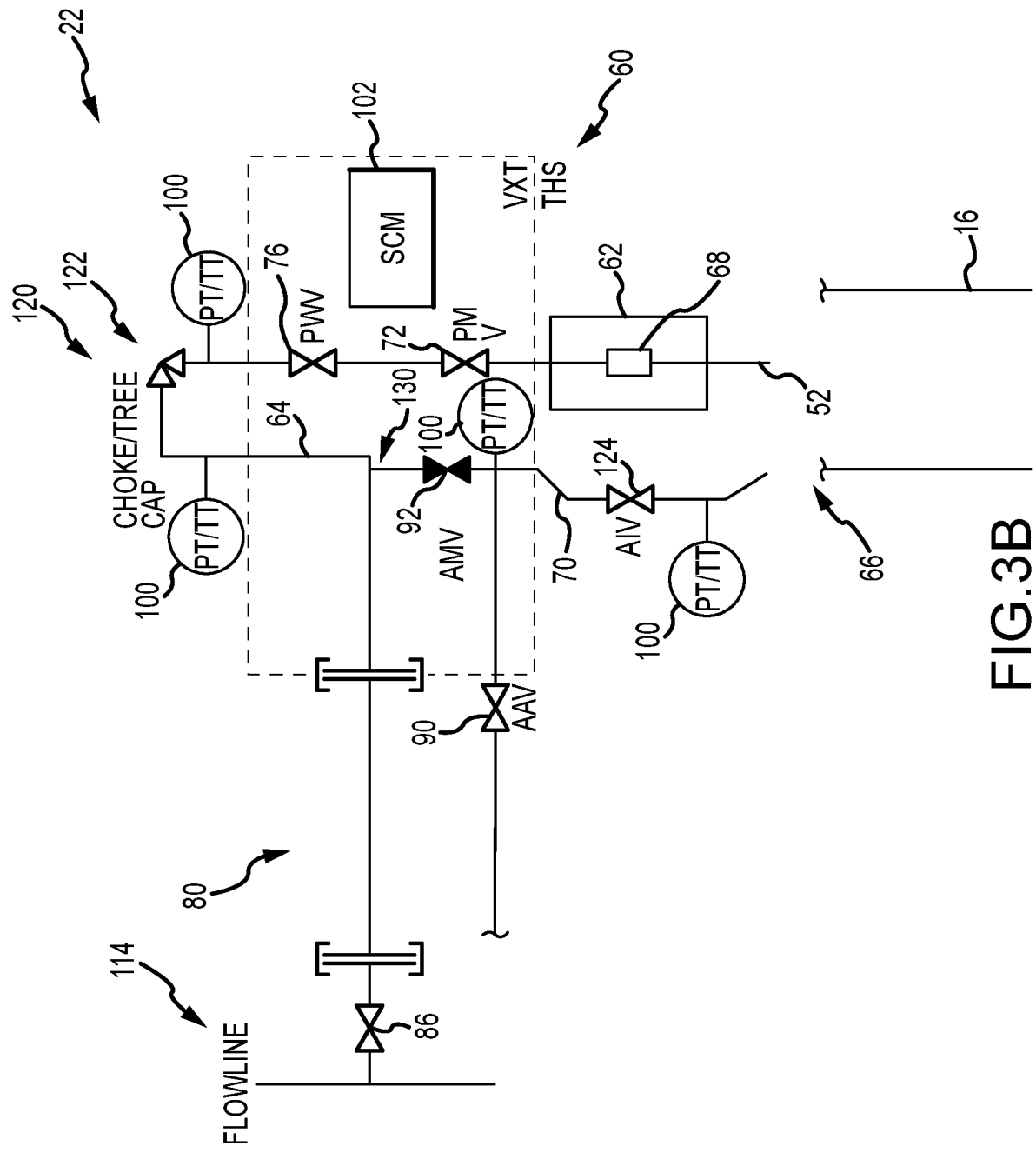
FIG. 3B is a schematic diagram of an embodiment of a simplified XT coupled to a tubing head spool, in accordance with embodiments of the present disclosure.

FIG. 3B is a schematic diagram of the simplified XT 22 arranged on the tubing head spool 60. Advantageously, the simplified XT 22 illustrated in FIG. 3B eliminates multiple valves present in the XT 22 of FIG. 2, while still maintaining the at least two barriers between the pressurized formation and the environment. As such, the XT 22 of FIG. 3B is easier to construct, costs less, and has fewer potential leak points. Moreover, in embodiments, the various valves in the XT 22 illustrated in FIG. 3B may be arranged to reduce the width or diameter of the XT 22, thereby facilitating transportation along roads and reducing the footprint at the well site. For example, compact actuators may be utilized and the valves may be arranged circumferentially about an outer circumference of the XT 22 such that the valves are not stacked at the same position, which also reduces the height of the XT 22. In other words, the actuators, and associated valves, may be at different circumferential or perimeter locations of the XT 22. The embodiment in FIG. 3B includes the wellbore 16 having the production tubing 52. Additionally, the annulus bore 70 is in fluid communication with the annulus 66. The illustrated tubing hanger 62 includes the isolation plug 68 to effectively isolate pressure and fluid from the reservoir and the production bore 64.

Turning to the illustrated production bore 64, the PMV 72 is arranged in series with the PWV 76. In the illustrated embodiment, there are no intervening valves between the PMV 72 and the PWV 76. However, it should be appreciated that in certain embodiments intervening components, such as valves, jumpers, sample lines, instrumentation, and the like may be arranged between the PMV 72 and the PWV 76. The production bore 64 is further coupled to the tree cap 120. In the illustrated embodiment, the tree cap 120 includes the choke 122. The choke 122 includes an orifice to control fluid flow rate and/or downstream system pressure. In certain embodiments, the choke 122 is adjustable to enable parameters of the system to change in accordance with operating conditions. Thereafter, the well jumper 80 couples the production bore 64 to a flowline tee 114. In the illustrated embodiment, the flowline tee 114 includes the production valve 86 for directing hydrocarbons from the wellbore 16 to a desired location, which may operate as a wing valve that is not located on the XT 22, in certain embodiments.

In comparing FIGS. 2 and 3B, several features have been omitted from the production bore 64 illustrated in FIG. 3B to simplify the configuration of the XT 22, while still maintaining at least two barriers between the formation and the environment. For example, the PWV 76 function is combined with PSV 74. Additionally, as will be described below, the XOV 104 may be removed from the system. This reduction in fittings and tubular length will reduce costs of the XT 22, while also adhering to governmental regulations. Furthermore, reducing the number of fittings may reduce the weight of the XT 22, thereby making shipping and/or installation easier because it may be utilized with standard equipment (e.g., flatbed trucks, rig cranes, etc.) without the need for additional specialty equipment (e.g., road escorts, high-weight cranes, etc.). In embodiments where the XT 22 is utilized in subsea services, reducing the overall footprint of the XT 22 may be advantageous because space on an offshore platform, for example, is limited. Additionally, utilizing standardized equipment saves money because the platforms may not be modified to accommodate different cranes and specialty vendors for transporting the goods may not be used.

The simplified XT 22 of FIG. 3B also has simplified annulus bore 70. In the illustrated embodiment, the annulus bore 70 includes a valve 124 which may be referred to as an annulus isolation valve (AIV). The AIV 124 is arranged in series with the AMV 92, which ties directly into the production bore 64 at the coupling 130. As such, the AIV 124 is arranged upstream of the AMV 92. Furthermore, the AAV 90 is arranged downstream of the AIV 124. In certain embodiments, the AAV 90 is coupled to a production umbilical. Therefore, when comparing FIGS. 2 and 3B with respect to the annulus bore 70, several valves have been eliminated while maintaining at least two barriers between the annulus 66 and the environment. For example, the AWVs 96, 98 are no longer arranged along the annulus bore 70. Moreover, the ASV 94 has been eliminated from the annulus bore 70. Accordingly, the cost of constructing the XT 22 will be reduced due to the decreased number of valves. Moreover, as described in detail above, the width, weight, height, and other physical features of the XT 22 may be reduced, thereby facilitating simplified transit and installation of the XT 22.

In the illustrated embodiment, the XT 22 includes the control module 102, however, there are no additional control modules illustrated in FIG. 3B. Due to the decreased number of valves in the system, the control module 102 may be capable of controlling each valve in the system, further simplifying the configuration of the system and removing the cost of supplying an additional controller.

Figure 4:
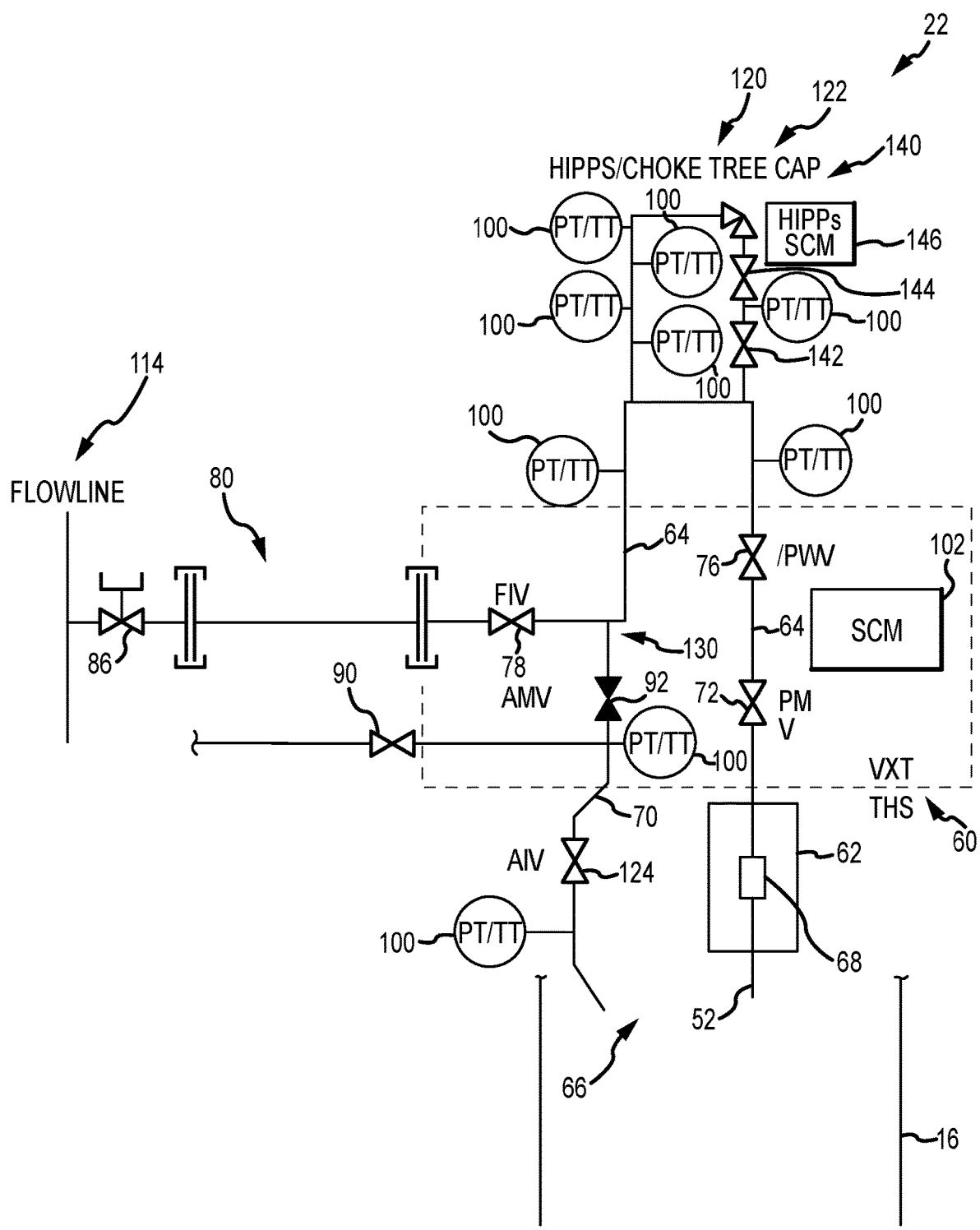
FIG. 4 is a schematic diagram of an embodiment of a simplified XT with high integrity pipeline protection system, in accordance with embodiments of the present disclosure.

FIG. 4 is a schematic diagram of an embodiment of the simplified XT 22 in which the tree cap 120 includes a high pressure pipeline protection system 140 (HIPPS). Certain embodiments of the XT 22 illustrated in FIG. 4 are shared with the XT 22 of FIGS. 3A and 3B. It should be appreciated that the HIPPS 140 can be installed between either the XT 22 and the manifold 82 or downstream of the manifold 82 to allow the production bore 64 or other flow line downstream of the HIPPS 140 to be delivered with a lower pressure rating. In certain embodiments, the HIPPS 140 is a stand-alone module that can be coupled to XT 22 or at another location. In the illustrated embodiment, the HIPPS 140 includes a pair of valves 142, 144 and the tree cap 120 and choke 122. In certain embodiments, the tree cap 120 and choke 122 may be integrated. Moreover, the HIPPS 140 includes additional pressure and/or temperature transducers 100 to monitor activity in the wellbore 16. It should be appreciated that the HIPPS 140 is designed to be removed from the XT 22 when operations using the HIPPS 140 are complete, such as when pressure in the reservoir is decreased and enhanced recovery techniques are used to recover additional hydrocarbons. In the embodiment illustrated in FIG. 4, the HIPPS 140 includes a control module 146, which may be a subsea control module.

Figure 5:
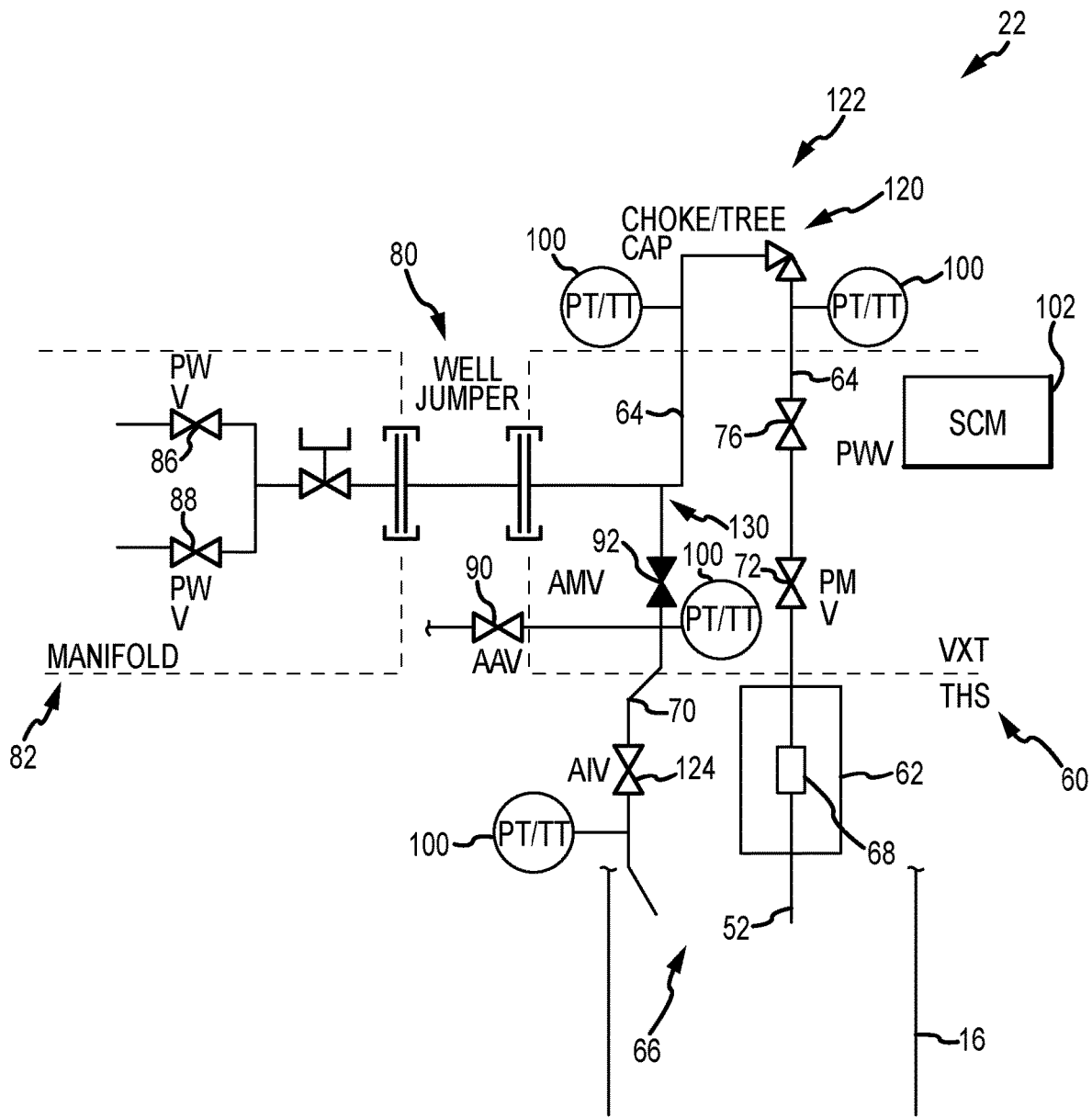
FIG. 5 is a schematic diagram of an embodiment of a simplified XT coupled to a tubing head spool, in accordance with embodiments of the present disclosure.

FIG. 5 is a schematic diagram of an embodiment of the simplified XT 22 coupled to the manifold 82 having the pair of production valves 86, 88. As described above with respect to FIGS. 3A and 3B, the XT 22 is mounted on the tubing head spool 60. The isolation plug 68 and AIV 124 are also illustrated, as described above. In certain embodiments, the AIV 124 may be integrated into the tubing head spool 60. The production bore 64 includes the PMV 72 and the PWV 76 arranged in series to effectively form the at least two barriers between the formation and the environment. The production bore 64 further includes the tree cap 120 and the choke 122. However, when comparing FIG. 5 to FIG. 3A it is evident that the FIV 78 has been removed from the production tubing. Yet, the functionality previously obtained from FIV 78 is achieved by the valves on the manifold 82, which may be controlled by the control module 102 in embodiments. Accordingly, these valves on the manifold 82 may operate like wing valves in the system that are not arranged on the XT 22. As a result, production bore 64 may be coupled directly to the well jumper 80 from the XT 22 and coupled to the manifold 82 downstream. Again, as mentioned above, removal of another valve from the system creates further simplicity while also reducing costs by eliminating components. Furthermore, the weight of the XT 22 is reduced when valves and other components are eliminated. Moreover, the control module 102 is free to control additional valves in the system due to fewer valves being mounted on the XT 22.

In the illustrated embodiment, the XT 22 includes the control module 102, however, the manifold 82 does not have the control module 84. Due to the decreased number of valves in the system, the control module 102 may be capable of controlling each valve in the system, further simplifying the configuration of the system and removing the cost of supplying an additional controller.

The embodiment illustrated in FIG. 5 further illustrates the annulus bore 70 which includes the AMV 92 arranged in series with the AIV 124 to form the at least two barriers between the formation and the environment. The annulus bore 70 is coupled to the production bore 64 at the coupling 130, as described above. In certain embodiments, the production bore 64 has a larger bore size than the annulus bore 70, which may be utilized with cross over components that will be described herein. Furthermore, the AAV 90 is coupled to the annulus bore 70 between the AIV 124 and the AMV 92 to enable connection to the umbilical, for example. Accordingly, the XT 22 illustrated in FIG. 5 includes significantly fewer valves and components than the XT 22 illustrated in FIG. 2, which reduces complexity and costs at the well site. Moreover, it should be appreciated that the HIPPS 140 described above may also be incorporated into the XT 22 illustrated in FIG. 5 to provide protection from high pressure situations.

Figure 6:
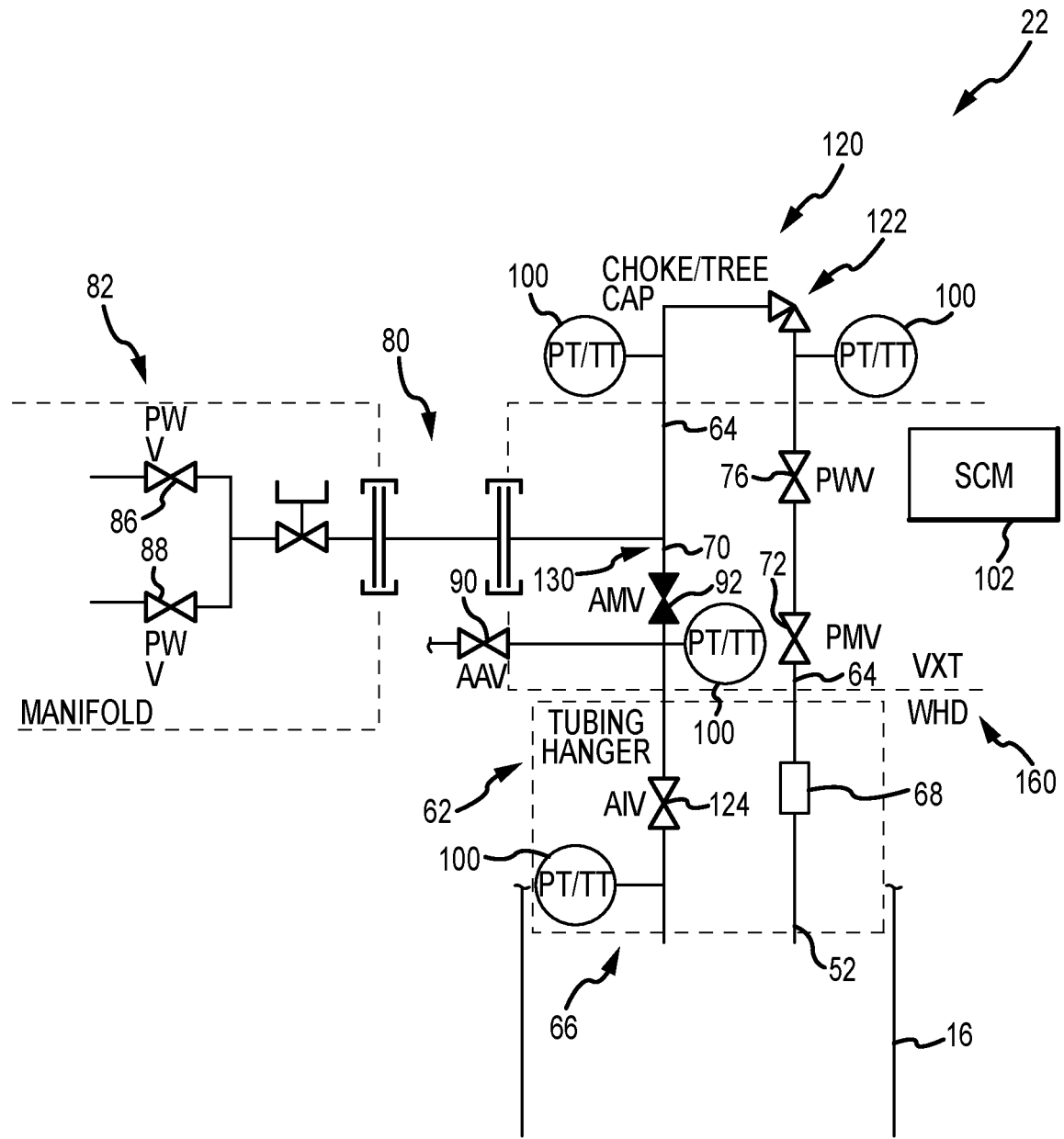
FIG. 6 is a schematic diagram of an embodiment of a simplified XT coupled to a wellhead, in accordance with embodiments of the present disclosure.

FIG. 6 is a schematic diagram of the simplified XT 22 arranged on a wellhead 160, which may be referred to as a wellhead assembly in certain embodiments. Different than the embodiments illustrated in FIGS. 2-5, coupling the XT 22 to the wellhead 160, which may or may not include one or more intervening components, may further reduce costs associated with production. The previously described tubing head spool 60 may have a higher elevation, relative to the ground plane, which may be the sea floor 42, than the illustrated coupling. The tubing head spool 60 is used to align the tubing hanger 62, but the same alignment may be provided by incorporating a removable orientation spool (not pictured), or other methods, above the wellhead 160 during installation of the tubing hanger 62. This not only reduces the overall elevation, but may simplify installation processes. The configuration of the XT 22 illustrated in FIG. 6 is otherwise similar to the configuration of FIG. 5. For example, the isolation plug 68 is arranged within the tubing hanger 62 and the AIV 124 is also within the tubing hanger 62. In the illustrated embodiment, the production bore 64 includes the at least two barriers via the PMV 72 and the PWV 76. Furthermore, the XT 22 includes the tree cap 120 and choke 122 coupled to the well jumper 80 for further connection to the manifold 82.

The annulus bore 70 of FIG. 6 is also similar to the configuration in FIG. 5. For example, the AIV 124 and AMV 92 in series provide at least two barriers between the formation and the environment. Moreover, the annulus bore 70 ties into the production bore 64 at the coupling 130 in the illustrated embodiment. As will be described below, the difference in bores between the production bore 64 and annulus bore 70 may facilitate installation of auxiliary equipment, such as a tie back tool or stab sub. In operation, the transducer 100 located on the annulus bore 70 between the AMV 92 and the AIV 124 may be utilized to monitor wellbore annulus pressure. However, in order to determine wellbore annulus pressure, the AIV 124 is positioned in the open position to transmit the pressure toward the transducer 100. In the event of a leak or failure of the AMV 92, the AIV 124 is closed and the transducer 100 is no longer used to monitor the wellbore annulus pressure. In the embodiment illustrated in FIG. 6, the transducer 100 is arranged upstream of the AIV 124, with respect to the direction of fluid flowing out of the wellbore. As a result, wellbore pressure may be monitored when the AIV 124 is closed, for example, when the XT 22 is removed or when the AMV 92 or AAV 90 leaks. Positioning the transducer 100 upstream of the AIV 124 may improve wellbore operations and reduce the likelihood of shutdowns due to leaking valves.

Figure 7:
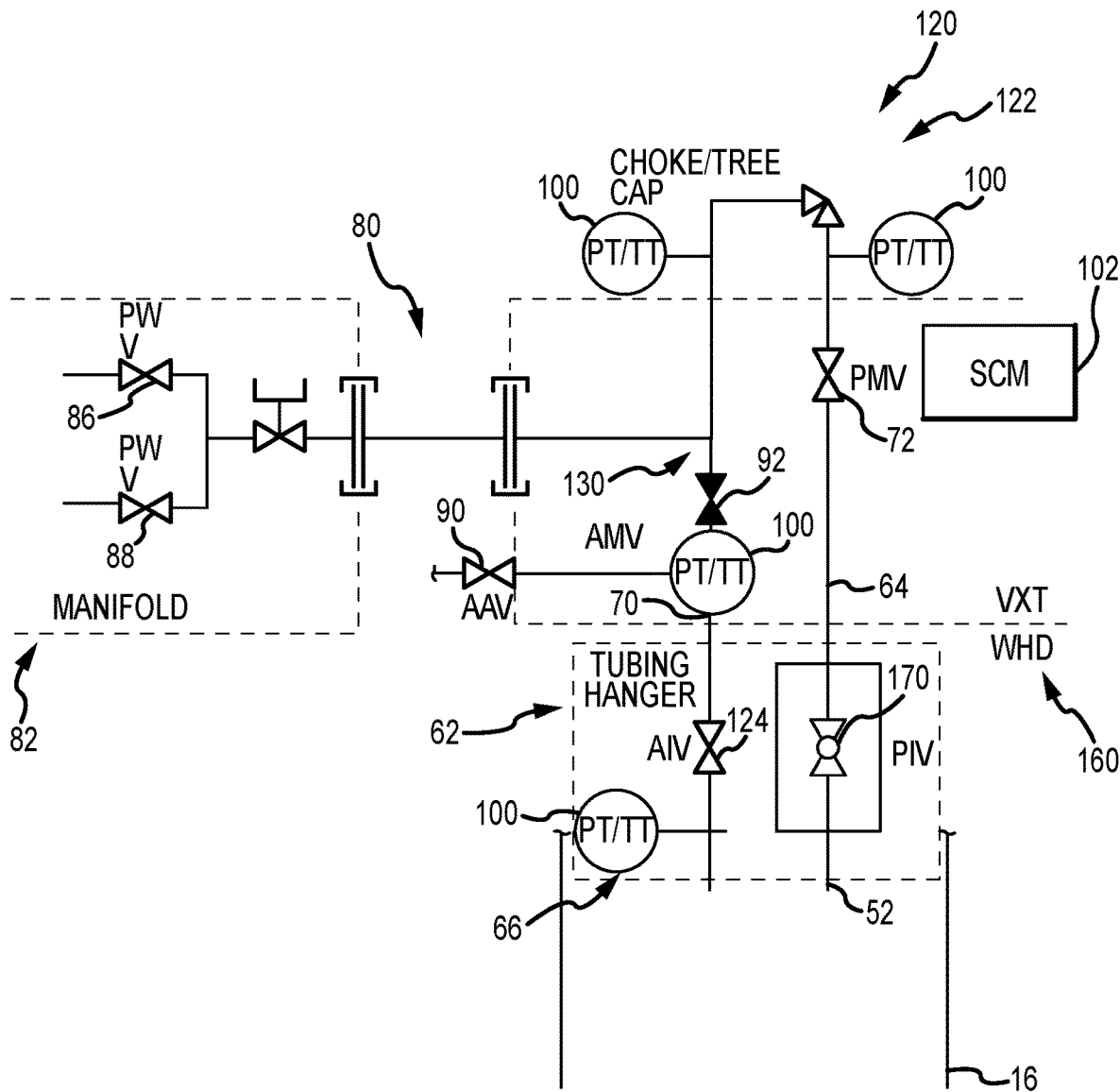
FIG. 7 is a schematic diagram of an embodiment of a simplified XT coupled to a wellhead, in accordance with embodiments of the present disclosure.

FIG. 7 is a schematic block diagram of an embodiment of the simplified XT 22 positioned on the wellhead 160. As described above, in certain embodiments, additional components may be positioned between the wellhead 160 and the XT 22, but for clarity the block diagram in FIG. 7 illustrates the components directly coupled. The tubing hanger 62 is arranged within the wellhead 160 and includes a valve 170 which may be referred to as a production isolation valve (PIV). The PIV 170 is arranged within the tubing hanger 62 and may be remotely actuated to enable closing in and opening of the wellbore 16. Because the PIV 170 is arranged within the wellbore 160, the production bore 64 can include the PMV 72 and still have at least two barriers between the formation and the environment. That is, the PIV 170 may count as one of the barriers, thereby further eliminating fittings in the XT 22 for reduced complexity and lower costs. Moreover, reducing the number of valves enables the control module 102 to communicate with and control other valves in the system, which reduces the number of control modules 102 and also decreases costs.

Further arrangement of the production bore 64 illustrated in FIG. 7 is similar to FIG. 6, in that the tree cap 120 and choke 122 are arranged downstream of the PMV 72 and couple to the well jumper 80 and the manifold 82. Similarly, the arrangement of the annulus bore 70 is also similar to FIG. 6. For example, the AIV 124 is arranged in series with the AMV 92 to provide at least two barriers between the formation and the environment. Moreover, the AAV 90 is also arranged between the AIV 124 and the AMV 92. The embodiment illustrated in FIG. 7 also includes the transducer 100 arranged upstream of the AIV 124, with respect to the direction of fluid flowing out of the wellbore. Accordingly, the simplified configuration may reduce costs and provide greater simplicity at the well site.

Figure 8:
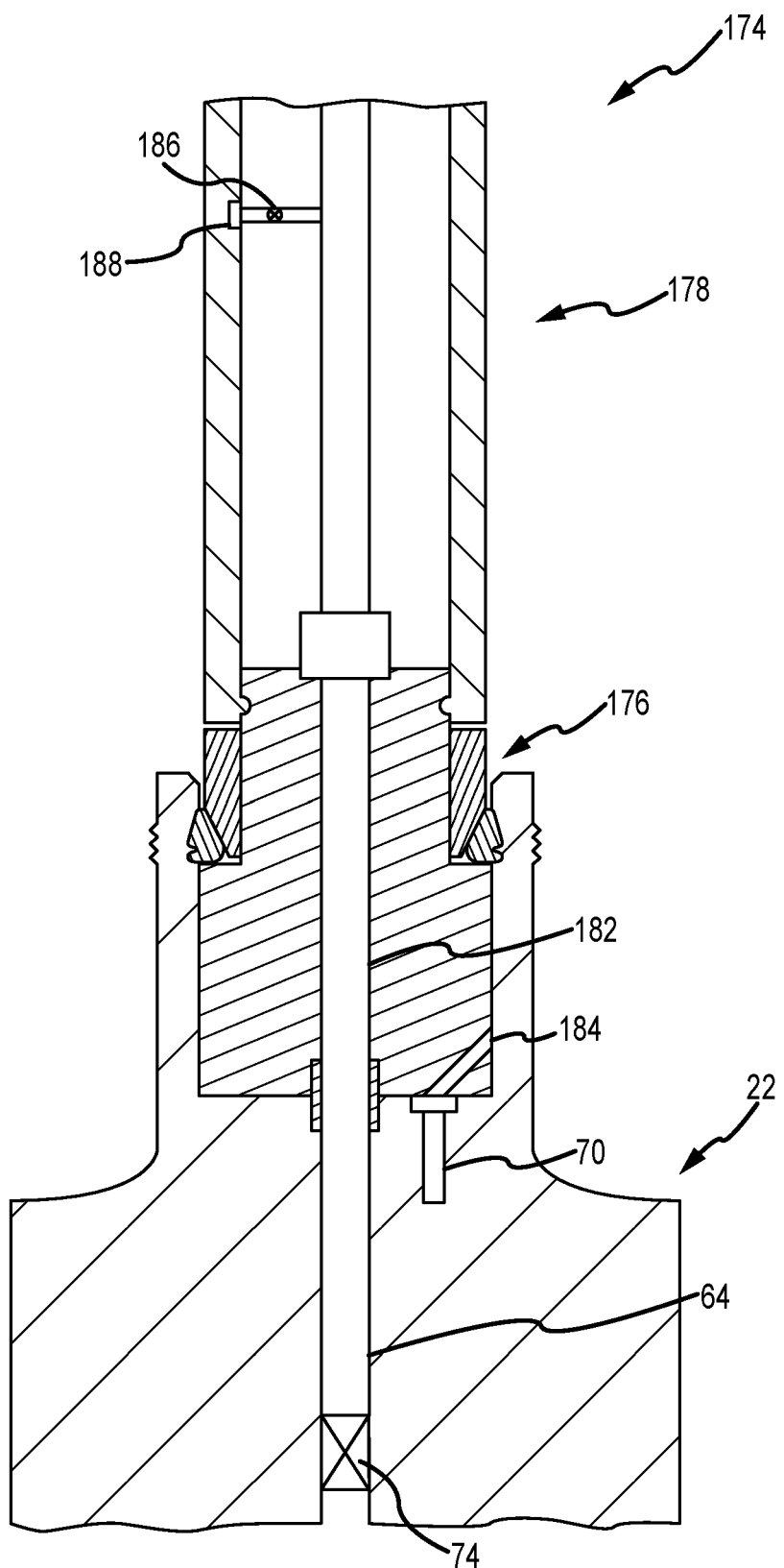
FIG. 8 is a partial cross-sectional side view of an embodiment of a tieback assembly coupled to a simplified XT, in accordance with embodiments of the present disclosure.

FIG. 8 is a schematic side view of a tieback assembly 174 to enable well clean up. In the illustrated embodiment, the tieback assembly 174 is coupled to a top of the XT 22 and includes a tree mandrel adaptor 176 and a tubing hanger running tool (THRT) 178. In operation, the tree mandrel adaptor 176 is installed in an upper bore of the XT 22 when the XT 22 is installed from the surface. The tree mandrel adaptor 176 enables the THRT 178 to connect to the top of the XT 22 for well clean up or work over operations. However, in embodiments, the tree mandrel adaptor 176 may be combined into the main body of the XT 22. As described above, in certain embodiments, the XOV 104 may be eliminated from the production bore 64, thereby eliminating a fitting, but also eliminating a flow path to couple the production bore 64 to the annulus bore 70. During completion operations, a first line 182 will fill with hydrocarbons or additives. The XOV 104 may be utilized to flow through the first line 182, such as flowing a cleaning solution through the first line 182, to clean out the hydrocarbons. In the illustrated embodiment, the tieback assembly 174 includes the first line 182 that couples to the production bore 64 and a second line 184 that couples to the annulus bore 70.

To enable the fluid connection between the second line 184 and the first line 182, the THRT 178 includes an actuated valve 186, such as a ball valve. When in an open position, fluid flows through a crossover line 188 and into the first line 182. When in the closed position, the flow through the crossover line 188 is blocked. In operation, the valve 186 is controlled by pressure from the drilling rig through an umbilical which is run to remotely operate the THRT 178 functions.

Figure 9:
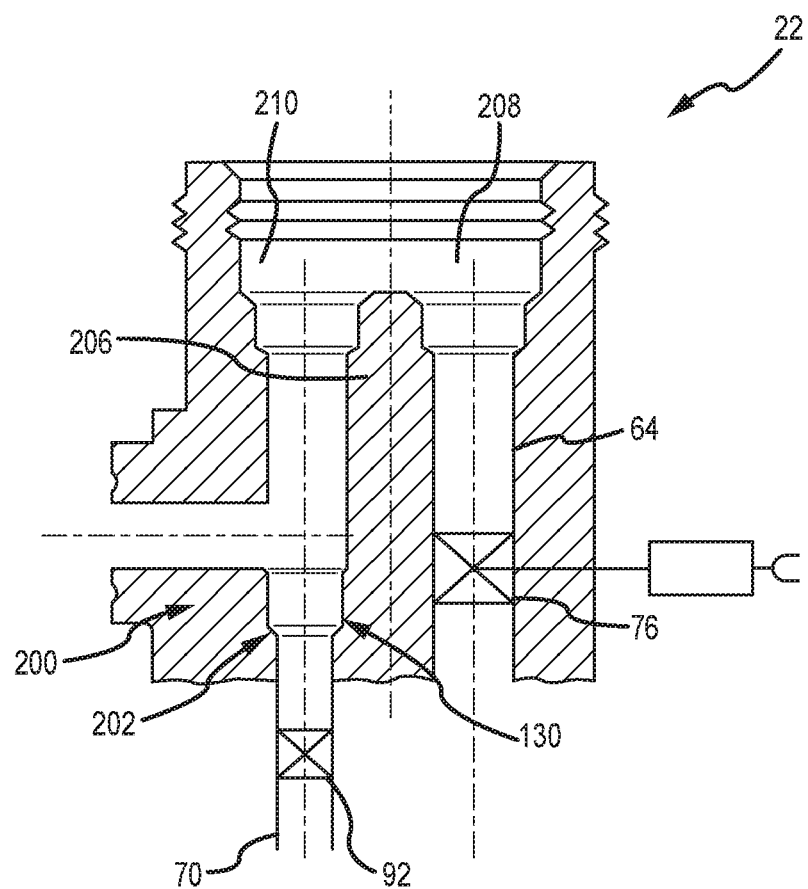
FIG. 9 is a partial cross-sectional side view of an embodiment of a simplified XT having a stab sub pocket, in accordance with embodiments of the present disclosure.

FIG. 9 is a partial schematic cross-sectional view of an embodiment of the XT 22, for example, the XT 22 illustrated in FIGS. 3-7. In certain embodiments, the annulus bore 70 has a smaller bore size than the production bore 64, as illustrated at the area 200 proximate the coupling 130 in FIG. 9. Accordingly, the difference in bore size creates a stab sub pocket 202 at the transition between the production bore 64 and the annulus bore 70. As will be described below, the stab sub pocket 202 enables a tubular to be inserted through the production bore 64 to make a fluid connection to the annulus bore 70 for enhanced recovery techniques, such as gas lift. The stab sub pocket 202 is arranged downstream of the AIV 124 and the AMV 92, relative to the direction of flow out of the annulus 66.

In the illustrated embodiment, the stab sub pocket 202 is positioned proximate the PWV 76 and separated by a body 206 of the XT 22. In operation, as recovered fluids flow through the production bore 64 toward the cap 120 (not pictured), the body 206 separates the flow until the hydrocarbons pass through the cap 120 and are directed toward the manifold 82. As will be described below, the stab sub pocket 202 enables this same flow path to be utilized when enhanced recovery techniques are utilized. The cap 120 and/or choke 122 may be coupled to the XT 22 at production stab pockets 208, 210.

Figure 10:
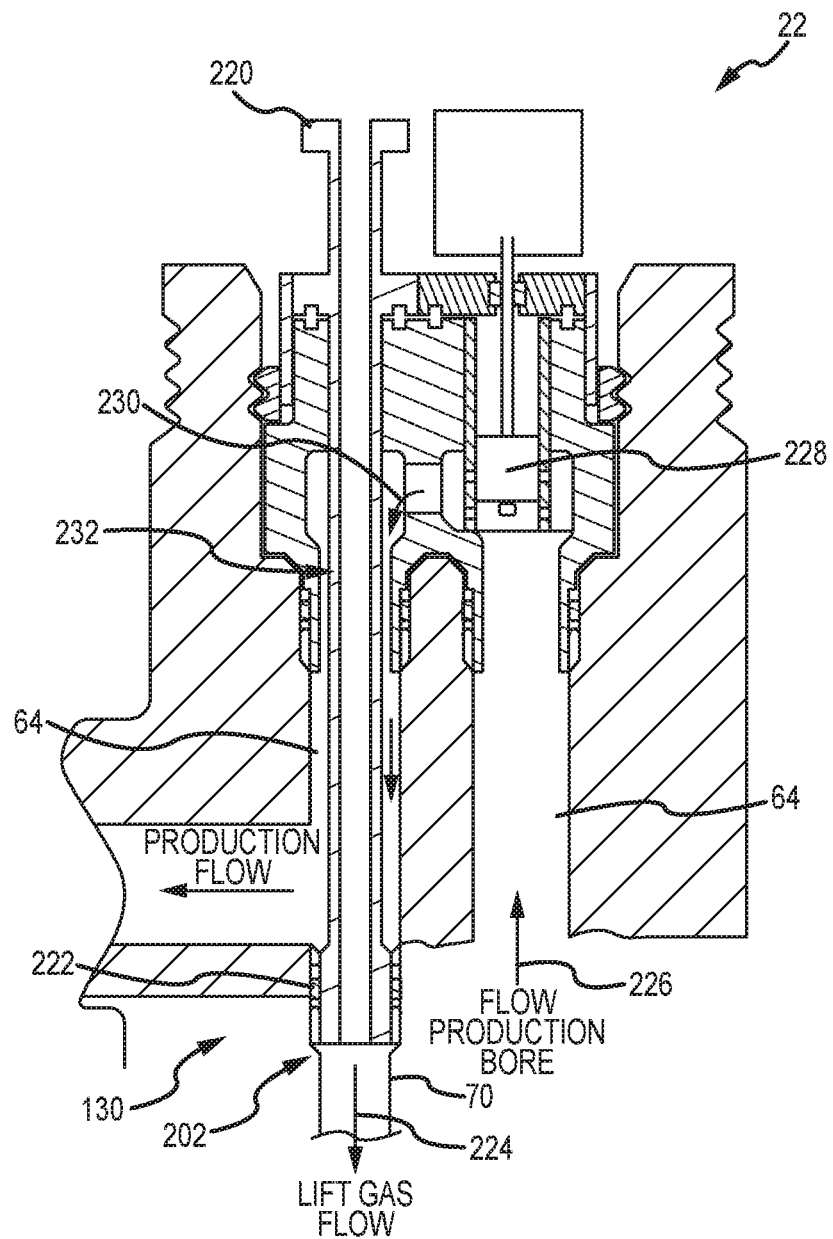
FIG. 10 is a partial cross-sectional side view of the simplified XT of FIG. 9 with an enhanced recovery cap, in accordance with embodiments of the present disclosure.

FIG. 10 is a partial schematic cross-sectional view of the XT 22, in which an enhanced recovery tubular 220 has been installed within the XT 22 to couple to the annulus bore 70. As described above, in certain embodiments the production bore 64 has a larger bore than the annulus bore 70. At the area 200 where the production bore 64 and the annulus bore 70 meet, the stab sub pocket 202 is formed to enable a fluid connection to the annulus bore 70. In the illustrated embodiment, the enhanced recovery tubular 220 extends through the production bore 64 and into the stab sub pocket 202. The enhanced recovery tubular 220 includes one or more seals 222 for creating a fluid tight barrier with the annulus bore 70, thereby blocking flow into the production bore 64 from the annulus 66. In enhanced recovery operations, such as gas lift operations, the lift gas is injected into the annulus 66, as represented by the arrow 224. The lift gas enters the production tubing 52 at a gas lift mandrel (not shown) to lift the hydrocarbons, thereby improving recovery. The produced hydrocarbons flow up through the production bore 64, as represented by the arrow 226. In the illustrated embodiment, the XT 22 includes a choke 228 that controls a flow rate of the produced hydrocarbons to the manifold 82.

As described above, in certain embodiments the annulus bore 70 has a smaller bore than the production bore 64. Accordingly, the enhanced recovery tubular 220 may also have a smaller bore than the production bore 64, thereby enabling flow through the production bore 64, even when the enhanced recovery tubular 220 is positioned within the production bore 64. The produced hydrocarbons flow along in the direction of an arrow 230 and into a production annulus 232 formed about the enhanced recovery tubular 220. Accordingly, the produced flow may be directed toward the manifold 82 (not pictured) for additional processing.

It should be appreciated that the enhanced recovery methods may be integrated into the cap 120, and therefore the cap 120 may be removed after enhanced recovery methods are complete and used at a different well site, thereby reducing the cost of manufacturing and purchasing additional components. Moreover, in embodiments, the valve 228 may be controlled and regulated by the control module 102 because of the reduced number of valves on the XT 22.

Figure 11:
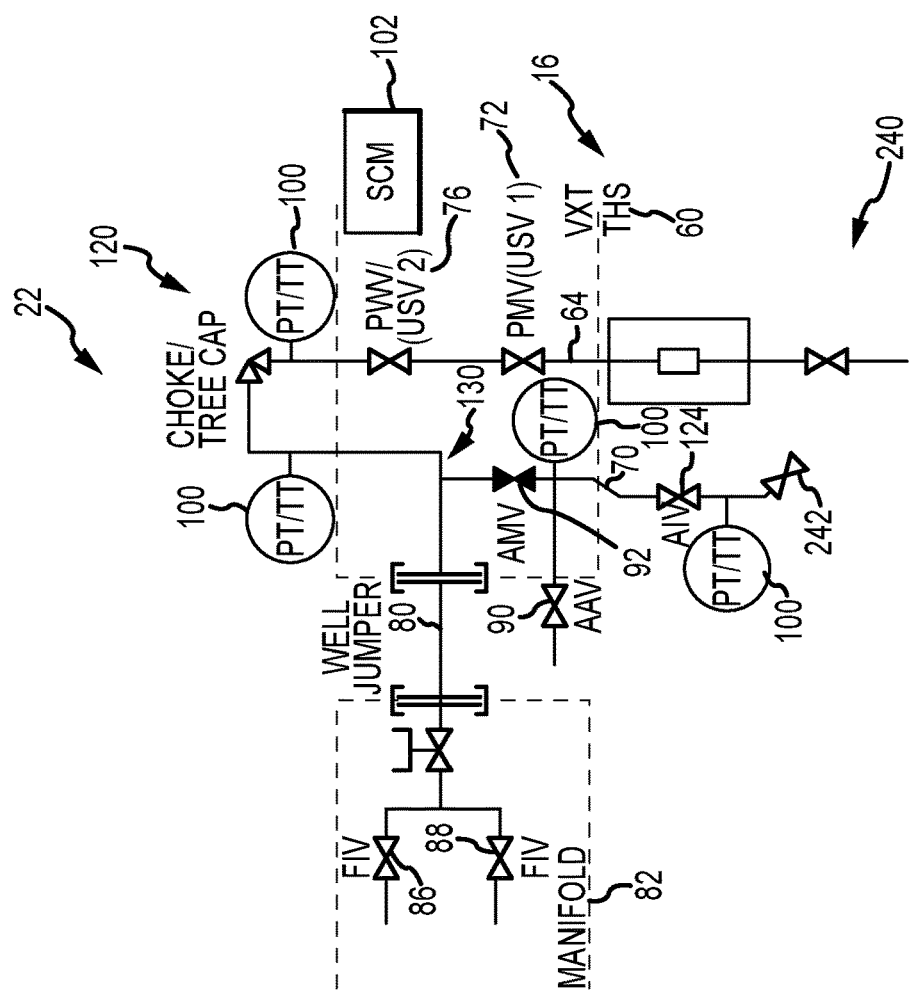
FIG. 11 is a schematic diagram of an embodiment of a simplified XT coupled to a tubing head spool, in accordance with embodiments of the present disclosure.

FIG. 11 is a schematic block diagram of an embodiment of the simplified XT 22 positioned on the tubing head spool

60. In the illustrated embodiment, the wellbore 16 includes a surface controlled subsurface safety valve (SCSSV) 240 arranged downhole of the isolation plug 68. It should be appreciated that the SCSSV 240 may be utilized to block in the wellbore 16 from the surface, for example, during use in subsea operations. The illustrated XT 22 includes the PMV 72 and the PWV 76 arranged in series on the production bore 64. As described in detail above, the production bore 64 includes at least two valves to isolate the wellbore 16 from the atmosphere (e.g., PMV 72 and PWV 76) to thereby satisfy government regulations and industry standards, but to also reduce the total number of valves associated with the production bore 64 by having the two valves integrated into the XT 22. In embodiments, the control module 102 is utilized to operate the PMV 72 and the PWV 76. The tree cap 120 is positioned downstream of the PWV 76 to direct hydrocarbons recovered from the wellbore 16 toward the manifold 82.

Turning to the annulus bore 70, the AIV 124 is arranged on the tubing head spool 60 below the XT 22. In certain embodiments, the AIV 124 is integrated into the tubing head spool 60. Moving downstream, relative to a direction of fluid flowing out of the wellbore 16, the AMV 92 is arranged in series with the AIV 124. As such, at least two barriers are arranged to isolate the wellbore 16 from the atmosphere. The annulus bore 70 also includes the AAV 90 in series with the AIV 124, which also forms two boundaries between the wellbore 16 and the atmosphere. In operation, the transducer 100 located on the annulus bore 70 between the AMV 92 and the AIV 124 may be utilized to monitor wellbore pressure. However, in order to determine wellbore pressure, the AIV 124 is positioned in the open position to transmit the pressure toward the transducer 100. In the event of a leak or failure of the AMV 92, the AIV 124 is closed and the transducer 100 is no longer used to monitor the wellbore pressure. In the embodiment illustrated in FIG. 11, the transducer 100 is arranged upstream of the AIV 124, with respect to the direction of fluid flowing out of the wellbore. As a result, wellbore pressure may be monitored when the AIV 124 is closed, for example, when the XT 22 is removed or when the AMV 92 or AAV 90 leaks. Positioning the transducer 100 upstream of the AIV 124 may improve wellbore operations and reduce the likelihood of shutdowns due to leaking valves. Furthermore, in the embodiment illustrated in FIG. 11, a valve 242 is arranged upstream of the transducer 100 arranged upstream of the AIV 124, with respect to the direction of fluid flowing out of the wellbore. In certain embodiments, the AIV 124 is actuated by a controller, such as the SCM 102 while the valve 242 is a manual valve that may be operated by the ROV 38.

In the illustrated embodiment, the annulus bore 70 ties into the production bore 64 downstream of the AMV 92 at the coupling 130. In certain embodiments, the XOV 104 may be utilized to couple the annulus bore 70 to the production bore 64. However, as shown in FIG. 11, the XOV 104 is not arranged on the XT 22, thereby reducing the number of fittings to reduce the cost, size, and complexity of the XT 22. It should be appreciated that the XT 22 illustrated in FIG. 11 may be used with the HIPPS 140 described above or any other reasonable cap 120 and/or choke 122. Additionally, as illustrated, the manifold 82 receives production fluid from the production bore 62 via the jumper 80. In embodiments, the manifold valves 86, 88 are controlled by the control module 102. Controlling the manifold valves 86, 88 via the control module 102 is accomplished due to the reduced number of valves associated with the XT 22, due embodiments of the present disclosure.

Figure 12:
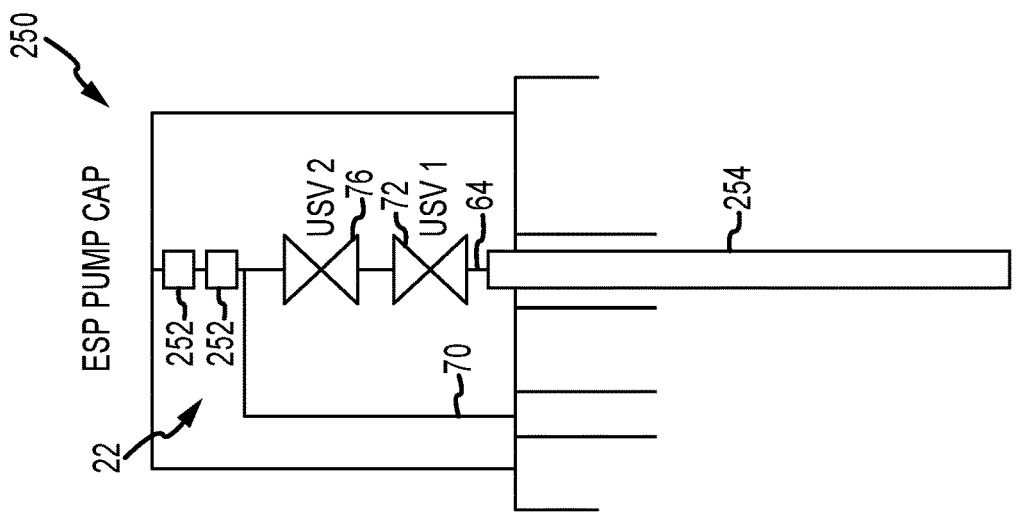
FIG. 12 is a schematic diagram of an embodiment of a pump cap coupled to an XT, in accordance with embodiments of the present disclosure.

FIG. 12 is a schematic diagram of an embodiment of a pump cap 250. In embodiments, the pump cap 250 may be referred to as an electric submersible pump (ESP) cap. As shown, the pump cap 250 is arranged to couple to the XT 22 at the top in place of the tree cap 120. The pump cap 250 illustrated in FIG. 12 includes a pair of isolation plugs or valves 252. These plugs or valves 252 are utilized to block in portions of the XT 22 to separate the pressure containing portions from the pump cap 250. As shown, the pump cap 250 is positioned downstream of the PMV 72 and the PWV 76, relative to a direction of flow out of the wellbore. In operation, the pump cap 250 may be equipped to lower an ESP 254 through the XT 22, specifically through the production bore 64 in the illustrated embodiment. For instance, at the end of life an oil well may undergo secondary recovery operations, such as pumping or gas lift, to extract hydrocarbons after formation pressures have been depleted. The arrangement illustrated in FIG. 12 enables the pump cap 250 to fully integrate into the XT 22 to lower the ESP 254 into the wellbore 16 through the production tubing 64. As a result, continued recovery from the well may commence without removing significant components, often resulting in delay and high costs. It should be appreciated that certain features have been eliminated for clarity. For example, in embodiments, the pump cap 250 may be covered and additional equipment, for example associated with the ESP 254, may also be installed proximate the wellbore 16.

Figure 13:
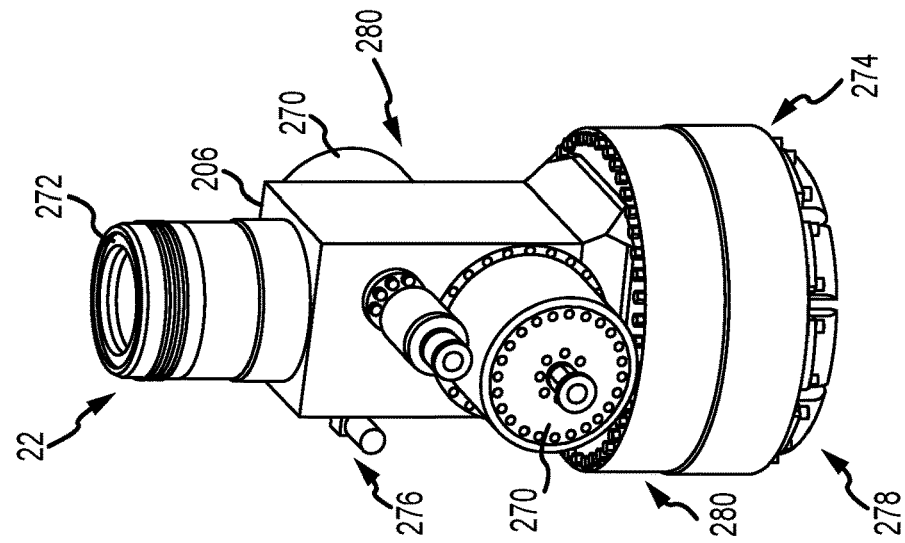
FIG. 13 is an isometric view of an embodiment of an XT, in accordance with embodiments of the present disclosure.

FIG. 13 is an isometric view of an embodiment of the XT 22. The illustrated XT 22 includes actuators 270 positioned on the body 206 of the XT 22. In certain embodiments, the actuators 270 are low-profile actuators, thereby reducing a width of the XT 22. As a result, the XT 22 may be transported to well sites, for example via highways, without escorts or special permitting due to the width. In other words, the XT 22 may be approximately as wide as a flatbed truck. Furthermore, the XT 22 illustrated in FIG. 13 does not include the cap 120, however, it should be appreciated that the cap 120 may be threaded or otherwise connected to a top 272 (e.g., upper surface) of the XT 22.

As shown in FIG. 13, the XT 22 includes a base 274 (e.g., lower surface) and extends upwardly toward the top 272. The body 206 forms at least a portion of the XT 22 and provides one or more mounting locations for various equipment and instrumentation, such as fittings 276 for coupling various lines, instrumentation, and the like to the XT 22 and the actuators 270. It should be appreciated that any reasonable number of fittings 276 may be included and that the number of fittings 276 and their respective positions are for illustrative purposes only and that certain features may be omitted for clarity. In certain embodiments, the fittings 276 may include the junctions illustrated in the diagrams above to couple the AAV 90 or other valve components to the XT 22. The XT 22 includes a circumference or perimeter 278. As illustrated, the actuators 270 are arranged at different circumferential positions 280 and extend outwardly a radial distance from the body 206.

Figure 14:
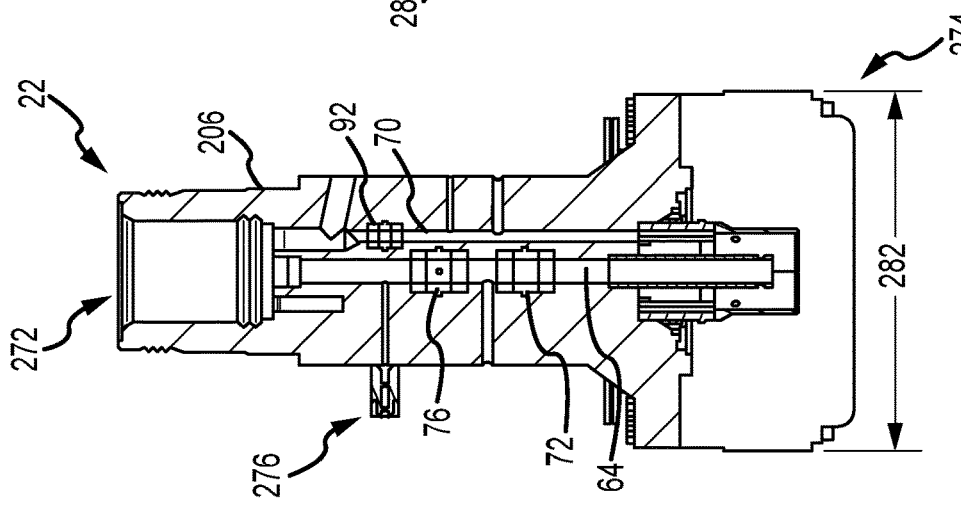
FIG. 14 is a cross-sectional side elevational view of an embodiment of an XT, in accordance with embodiments of the present disclosure.

FIG. 14 is a cross-sectional side view of the XT 22 illustrating the production bore 64 and the annulus bore 70 extending through the body 272. As described above, in certain embodiments the production bore 64 includes the PMV 72 and the PWV 76 that may be integrated into the body 206 of the XT 22. In the embodiment shown in FIG. 14, there are only two valves along the production bore 64 to isolate the wellbore 16 from the atmosphere. The production bore 64 extends upward toward the top 272 to the tree cap 120 (not illustrated) before being directed out of the body 206. Accordingly, in the embodiment illustrated in FIG. 14, significant portions of the production bore 64 and associated valving are incorporated into the body 206 of the XT 22, thereby providing additional strength for high pressure applications.

The illustrated XT 22 also includes the annulus bore 70 extending through the body 206 of the XT 22. As shown, the annulus bore 70 is arranged proximate the production bore 64. However, it should be appreciated that in certain embodiments the annulus bore 70 and the production bore 64 may be concentric. In other words, the annulus bore 70 and the production bore 64 may share a common axis. Furthermore, in embodiments, one or more production stabs in the cap 120 may also be concentric or share a common axis. The illustrated annulus bore 70 includes the AMV 92. As described above, the AIV 124 is arranged on or within the tubing head spool 60 and therefore is not illustrated in FIG. 14.

As described above, embodiments of the present disclosure are directed toward a simplified and compact XT 22. As shown, the associated fittings 276 are arranged such that they do not extend outwardly past a width 282 of the body 272. Accordingly, transportation and installation of the XT 22 may be simplified, thereby reducing cost or complexity at the well site.

Figure 15:
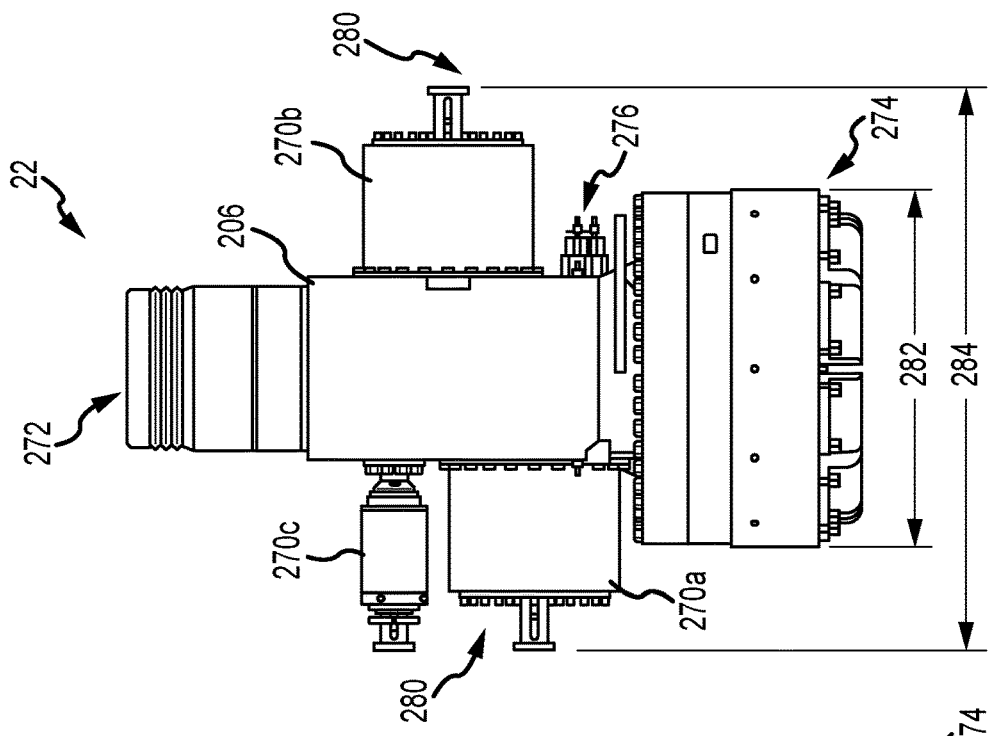
FIG. 15 is a side elevational view of an embodiment of an XT, in accordance with embodiments of the present disclosure.

FIG. 15 is a side elevational view of the XT 22. In the illustrated embodiments, the actuators 270 for the valves 72, 76 in the production tubing 64 are arranged on opposite sides of the body 206, thereby reducing the height or elevation of the XT 22. For instance, the actuator 270a is arranged to control the PMV 72 and the actuator 270b is arranged to control the PWV 76. By positioning the actuators 270a, 270b on opposite sides of the XT 22, portions of the actuator bodies may overlap, as illustrated in FIG. 15. If the actuators 270a, 270b were stacked, these actuator bodies would not be able to overlap, thereby increasing the overall height or elevation of the XT 22. Advantageously, the actuator 270 also enables the actuator 270c that controls the AMV 92 from extending the height of the XT 22 because portions of the actuator 270c body align with portions of the actuator 270b body. In other words, the configuration of the actuators 270 on the body 206 are particularly selected to decrease the height of the XT 22. In the illustrated embodiment, the actuators 270 extend outwardly from the body 206 and are radially wider than the width 282, as illustrated by the width 284. Yet, the inclusion of low profile actuators, as illustrated in FIG. 15, along with the varying circumferential positions 280, enables a smaller footprint for the XT 22 than by utilizing traditional actuators.

Figure 16:
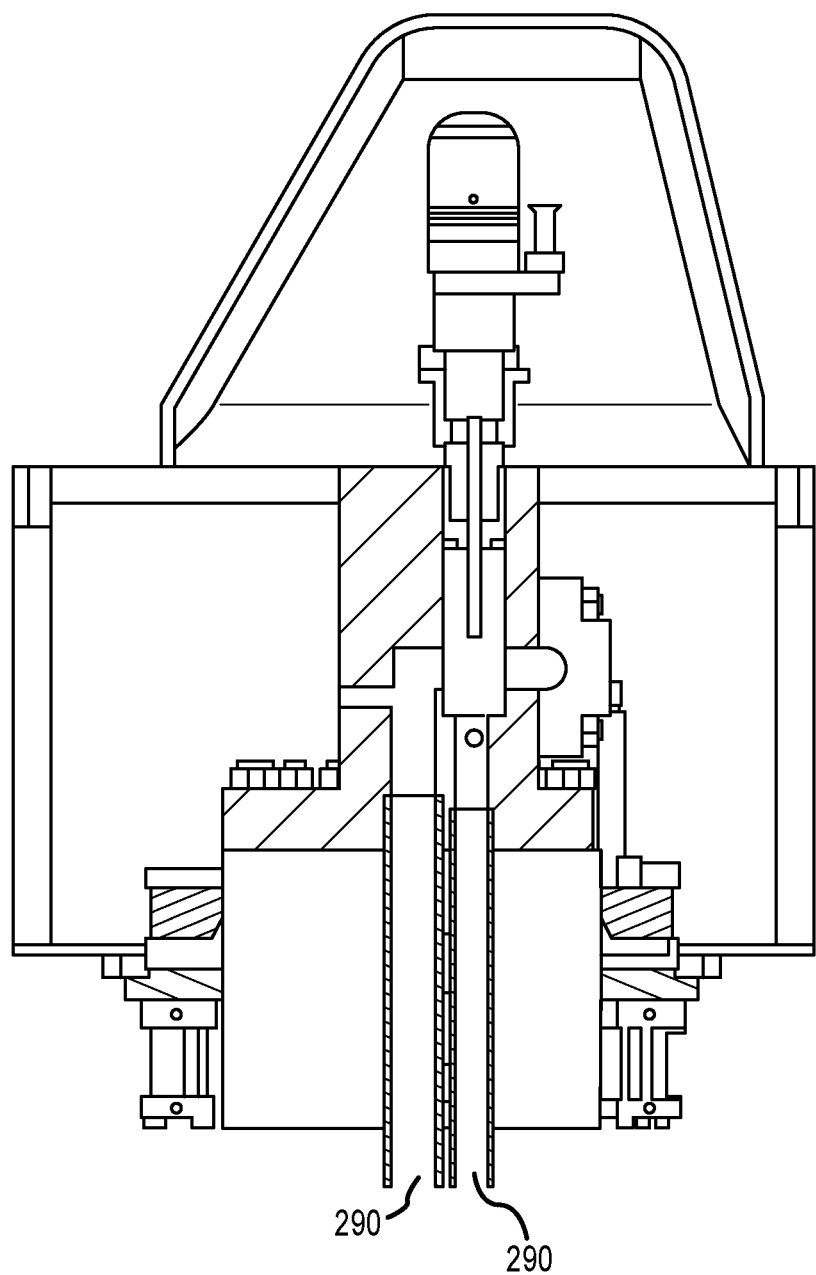
FIG. 16 is a partial schematic side elevational view of an embodiment of an XT having stabs, in accordance with embodiments of the present disclosure.

FIG. 16 is a partial schematic side view of an embodiment of the XT 22 having a pair of stabs 290. As shown in the illustrated embodiment, the pair of stabs 290 is substantially parallel to one another. In certain embodiments, the stabs 290 may be the same size. That is, the pair of stabs 290 may have equal diameters. However, it should be appreciated that in certain embodiments the stabs forming the pair of stabs 290 may have different diameters.

Figure 17:
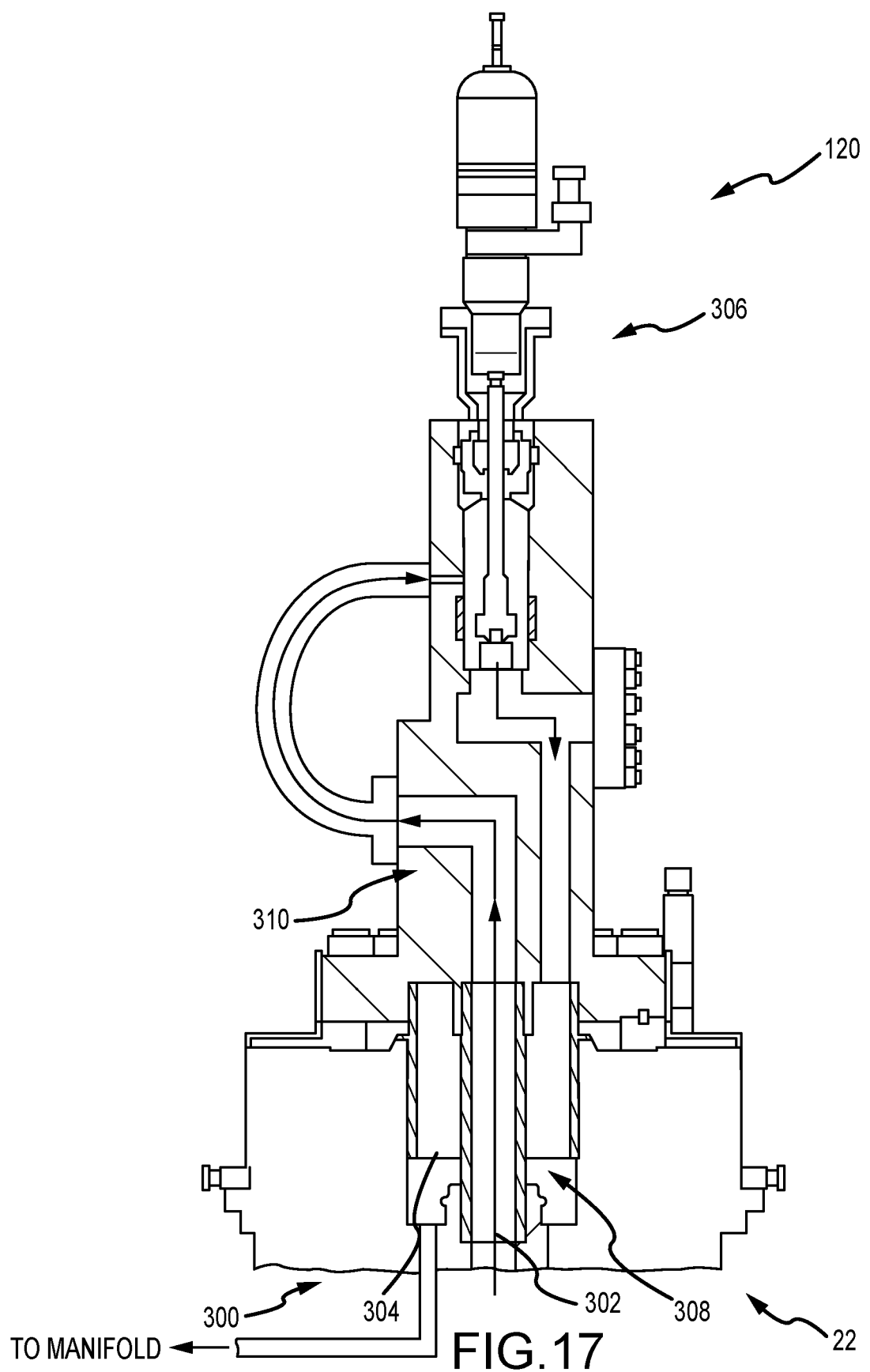
FIG. 17 is a partial schematic side elevational view of an embodiment of an XT having stabs, in accordance with embodiments of the present disclosure.

FIG. 17 is a partial schematic side view of an embodiment of the XT22 having concentric stabs 300. In the illustrated embodiment, an inner stab 302 is arranged coaxially with an outer stab 304. The outer stab 304 has a larger diameter than the inner stab 302. In operation, flow from the wellbore 16 flows through the inner stab 302 and through a flow loop 306 in the cap 120 via a flow path 310. Thereafter, the fluid enters the annular area 308 formed between the inner stab 302 and the outer stab 304. Next, the fluid is directed out of the XT 22, for example via a tubular that may direct the flow to a manifold or the like. Accordingly, as described herein, the XT 22 and/or the cap 120 may include one or more parallel and/or concentric flow paths to facilitate transportation of fluid.

As described in detail above the simplified XT 22 illustrated in embodiments of the present disclosure includes a reduced number of valves and fittings to form a smaller number of leak points and reduce the complexity of the XT 22. Moreover, because of the reduced number of valves, the control module 102 associated with the XT 22 may control valves on auxiliary components, such as the manifold 82 or the like. Embodiments of the XT 22 also satisfy government regulations for oil and gas recovery because at least two barriers are maintained between the pressurized formation and the environment. For example, the production bore 64 maintains at least two barriers and so does the annulus bore 70. This arrangement is accomplished in the embodiments described above by coupling the annulus bore 70 to the production bore 64 via the stab sub pocket 202, which may further be used for enhanced recovery methods. Additionally, embodiments of the simplified XT 22 may also be used with enhanced recovery methods that may be integrated into the cap 120, such as gas lift operations. Additionally, well cleaning may be accomplished with the tieback assembly 174 that includes the actuated valve 186 positioned in the THRT 178 to enable cleaning operations in the well. Furthermore, the XT 22 may have a smaller footprint due to the circumferential positions of the respective actuators 270 to decrease the width 282 and/or height of the XT 22. In this manner, simplified XTs 22 may be used at well sites while still satisfying government regulations and industry standards.

The foregoing disclosure and description of the disclosed embodiments is illustrative and explanatory of the embodiments of the invention. Various changes in the details of the illustrated embodiments can be made within the scope of the appended claims without departing from the true spirit of the disclosure. The embodiments of the present disclosure should only be limited by the following claims and their legal equivalents.

The invention claimed is:

1. A system for recovering hydrocarbons from a wellbore, comprising:
 a first annulus valve formed in a wellbore component, the first annulus valve being fluidly coupled to an annulus of the wellbore;
 a production tree coupled to the wellbore component, the production tree comprising:
  a production bore fluidly coupled to production tubing via the wellbore component, the production bore extending through a body of the production tree toward a tree cap and directing the downhole fluids out of the production tree;
  a first production valve arranged in the production bore, the first production valve being moveable between an open position and a closed position to regulate the flow of the downhole fluids through the production bore and positioned in a downstream direction from the wellbore component;
  a second production valve arranged in the production bore, the second production valve being movable between an open position and a closed position to regulate the flow of the downhole fluids through the production bore, the second production valve positioned downstream of the first production valve and in series with the first production valve such that downhole fluids that flow through the first production valve are directed toward the second production valve, the second production valve being upstream relative to the tree cap;

an annulus bore fluidly coupled to the annulus of the wellbore, the annulus bore being coupled to the production bore downstream of the tree cap at a coupling; and a second annulus valve arranged in the annulus bore, the second annulus valve being positioned downstream of the first annulus valve and upstream of the coupling to the production bore;

wherein the first production valve and the second production valve provide two barriers of protection between the wellbore and a tree outlet and the first annulus valve and the second annulus valve provide two barriers of protection between the wellbore and the tree outlet, the two barriers formed by the first annulus valve and the second annulus valve being upstream of the coupling to the production bore.

2. The system of claim 1, wherein the wellbore component comprises a tubing head spool.

3. The system of claim 1, further comprising a transducer arranged on the annulus bore, the transducer positioned downstream of the wellbore component.

4. The system of claim 1, further comprising a transducer arranged on the production bore, the transducer determining at least one of a pressure or a temperature of the production bore and positioned downstream of the wellbore component.

5. The system of claim 1, further comprising a third annulus valve, the third annulus valve being downstream of the wellbore component.

6. The system of claim 1, further comprising a control module, the control module being communicatively coupled to at least one of the first annulus valve, the second annulus valve, the first production valve, or the second production valve.

7. The system of claim 1, further comprising a stab sub pocket arranged in the annulus bore upstream of the coupling to the production bore, wherein the stab sub pocket receives a tubular to perform enhanced recovery operations.

8. The system of claim 1, further comprising a pump cap, the pump cap coupling to a top of the tree to perform enhanced recovery operations.

9. The system of claim 1, further comprising a high pressure pipeline protection system (HIPPS), the HIPPS being positioned downstream of the first and second production valves.

10. A system for directing the flow of fluids into and out of underground formations containing hydrocarbons, the system comprising:

a wellhead apparatus supporting a tubing hanger, the wellhead apparatus at least partially enclosing a lower section of a production bore and a lower section of an annulus bore, wherein the lower section of the annulus bore includes a first annulus valve; and a production tree positioned downstream of and coupled to the wellhead apparatus, the production tree extending upwardly from a lower surface to an upper surface and at least partially enclosing an upper section of the production bore and an upper section of the annulus bore, wherein one of the lower section and the upper section of the production bore includes a first production valve, the upper section of the production bore includes a second production valve, and the upper section of the annulus bore includes a second annulus valve.

11. The system of claim 10, wherein a tree cap includes a pump to perform enhanced recovery operations.

12. The system of claim 11, wherein the tree cap includes a choke to regulate the flow of fluids through the production bore.

13. The system of claim 10, further comprising a tree cap having a first stab and a second stab concentrically formed such that an axis of the first stab is substantially aligned with an axis of the second stab.

14. The system of claim 10, further comprising a stab sub pocket positioned in the upper section of the annulus bore, the stab sub pocket arranged to receive a tubular extending through the annulus bore from a top of the production tree to perform enhanced recovery operations.

15. The system of claim 10, further comprising a manifold positioned downstream of and coupled to the production tree, wherein the manifold includes at least one manifold valve and controls a flow of fluid from the production tree.

16. A system for recovering hydrocarbons from a wellbore, the system comprising:

a production tree coupled to the wellbore, the production tree including a production bore and an annulus bore, both extending from a base of the production tree to a top of the production tree;

a first production valve arranged in the production bore, the first production valve being movable between an open position and a closed position to regulate flow of a fluid through the production bore;

a second production valve arranged in the production bore downstream of the first production valve, the second production valve being moveable between an open position and a closed position to regulate flow of fluid through the production bore;

a first annulus valve arranged in the annulus bore, the first annulus valve being movable between an open position and a closed position to regulate flow of fluid through the annulus bore;

a first production valve actuator coupled to the first production valve, the first production valve actuator extending radially outward from the production tree at a first circumferential location; and a second production valve actuator coupled to the second production valve, the second production valve actuator extending radially outward from the production tree at a second circumferential location, the second circumferential location being offset from the first circumferential location such that the first and second production valve actuators extend radially outward in different radial directions.

17. The system of claim 16, further comprising a pump cap, the pump cap positioned at the top of the production tree and including a pump to perform enhanced recovery operations.

18. The system of claim 16, further comprising a tree cap having a first stab and a second stab, the first and second stabs being concentrically formed such that an axis of the first stab is substantially aligned with an axis of the second stab.

19. The system of claim 16, further comprising a high pressure pipeline protection system (HIPPS), the HIPPS being positioned downstream of the first and second production valves.

20. The system of claim 16, further comprising at least one transducer positioned on the annulus bore to measure at least one of a pressure or temperature of the annulus, the at least one transducer arranged downstream of the first annulus valve and on the production tree.

\* \* \* \* \*